May 2, 1961   L. J. BISHOP ET AL   2,982,228
OVERHEAD TRUCK PUSHER AND DISPATCH SYSTEMS
Filed Sept. 3, 1958   14 Sheets-Sheet 1
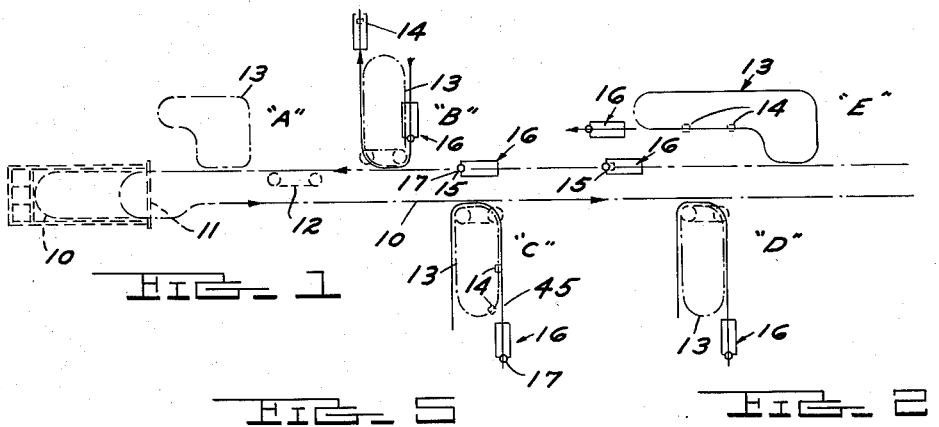
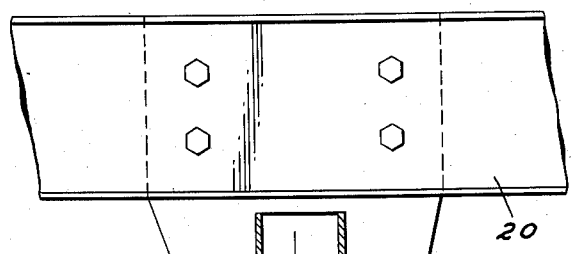
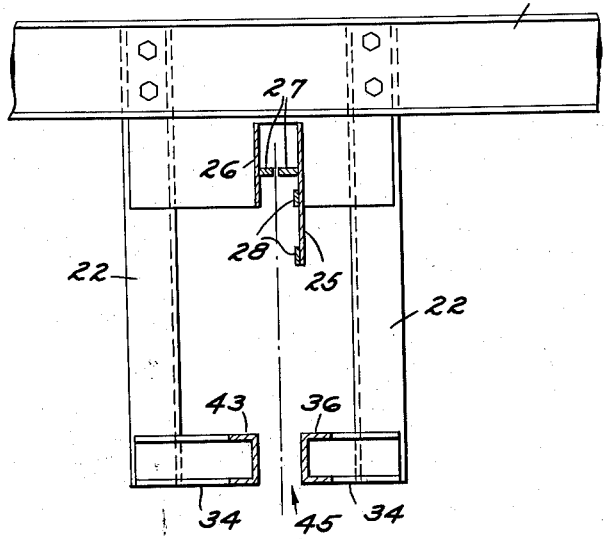
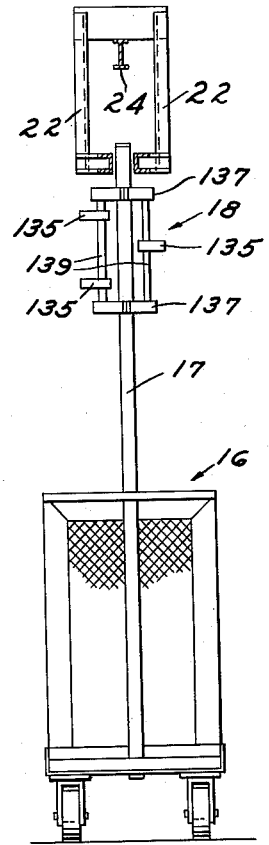
INVENTORS
LEONARD J. BISHOP
ERIC GOTTSCHALK
BY Whittemore Hulbert &
Belknap
ATTORNEYS

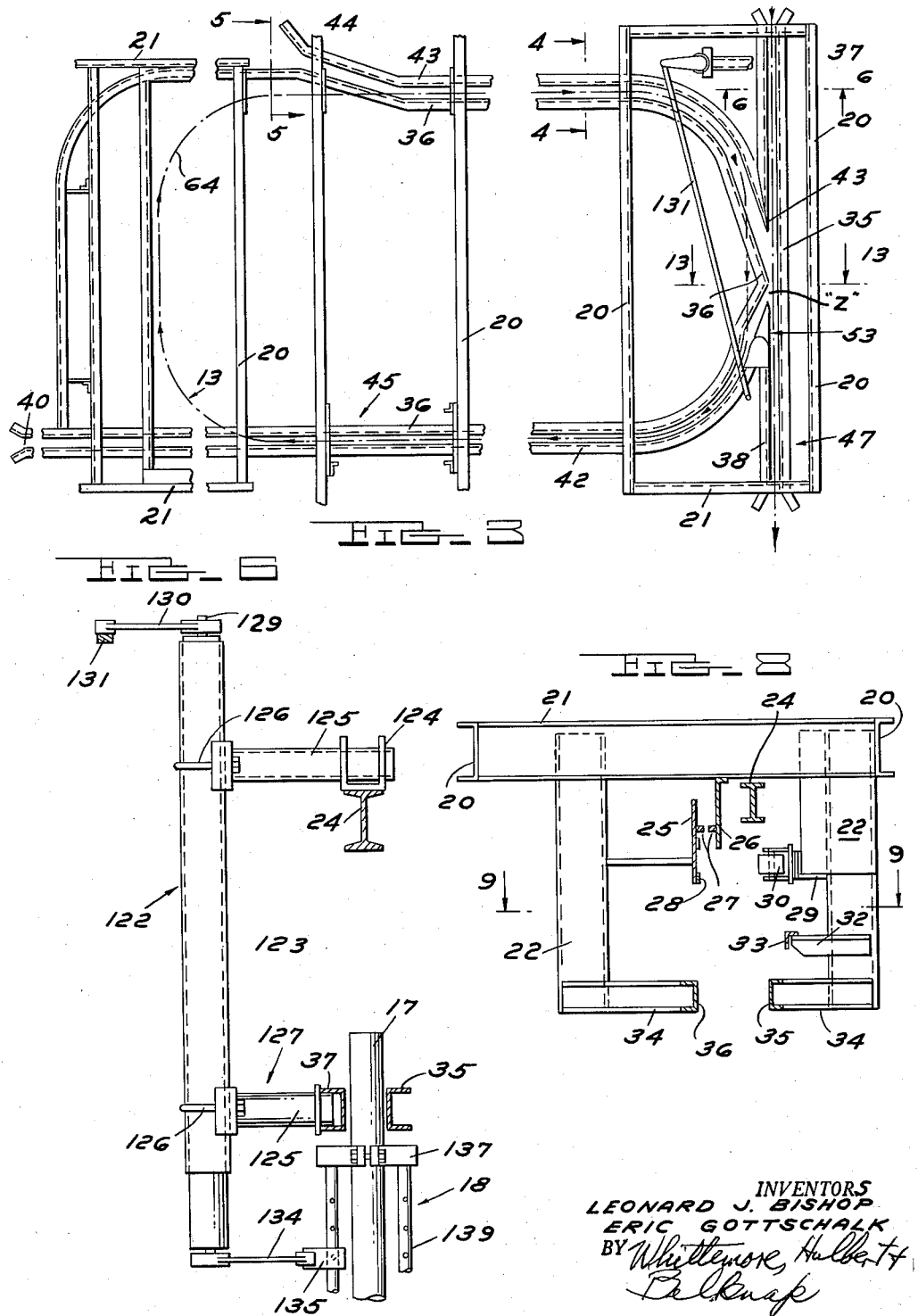

May 2, 1961   L. J. BISHOP ET AL   2,982,228
OVERHEAD TRUCK PUSHER AND DISPATCH SYSTEMS
Filed Sept. 3, 1958   14 Sheets-Sheet 3
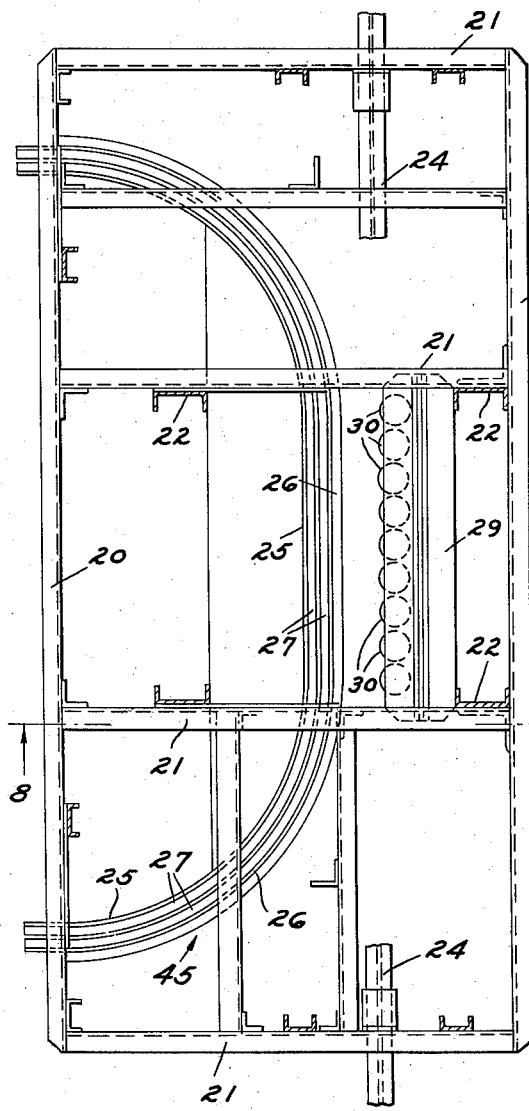
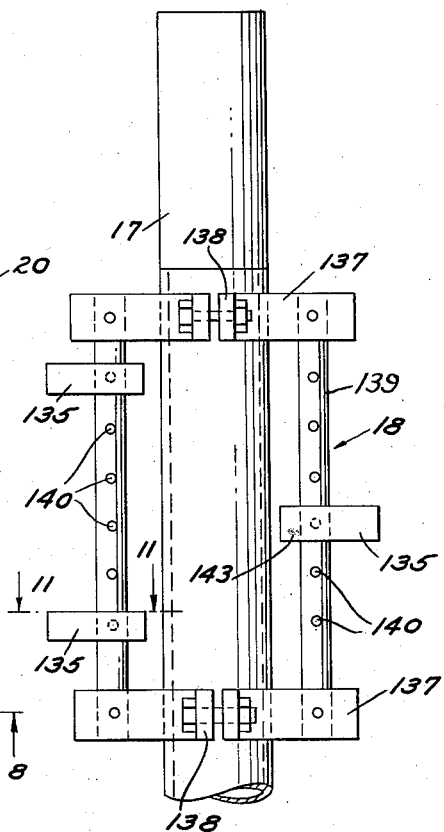
INVENTORS
LEONARD J. BISHOP
ERIC GOTTSCHALK
BY Whittemore, Hulbert &
Belknap
ATTORNEYS

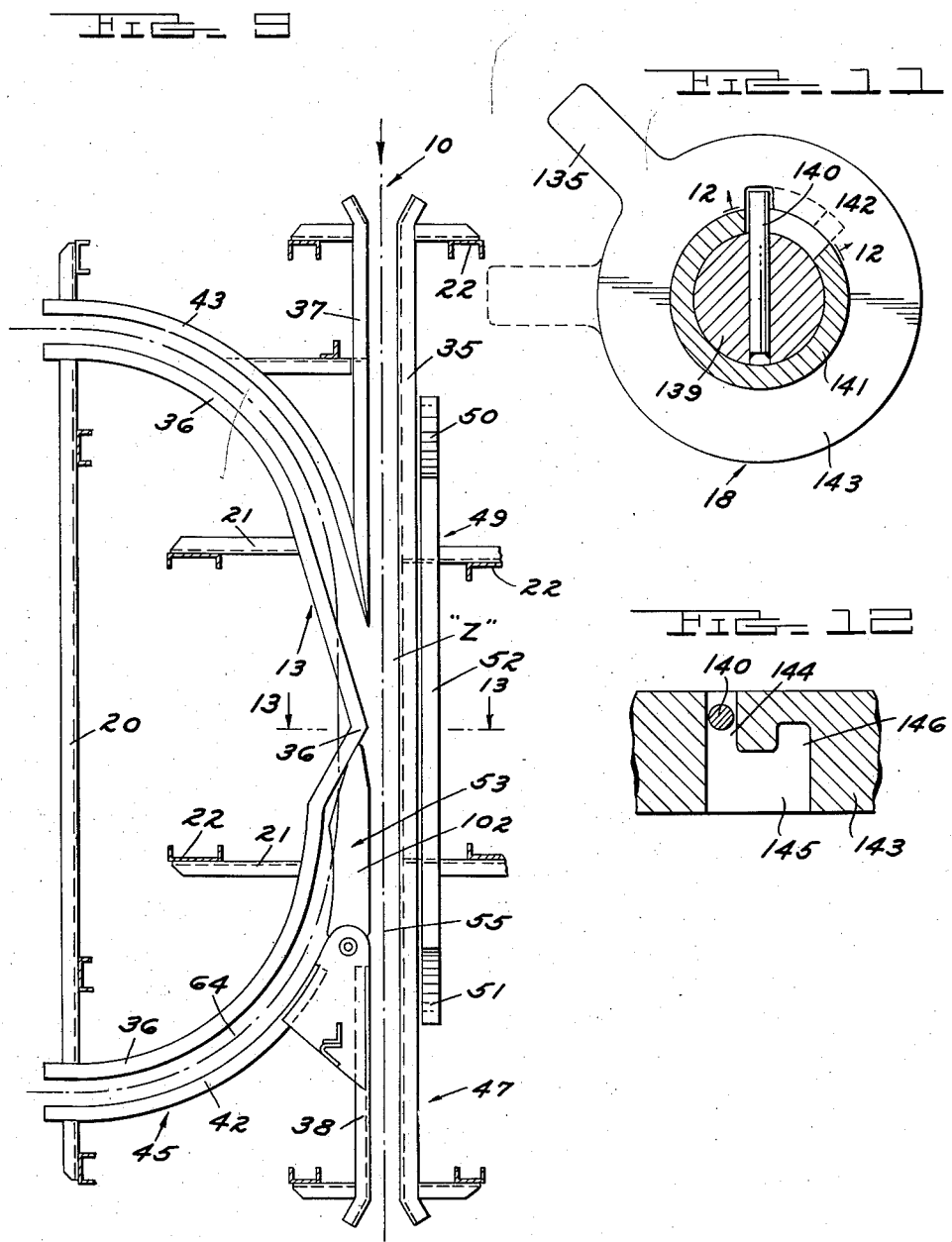

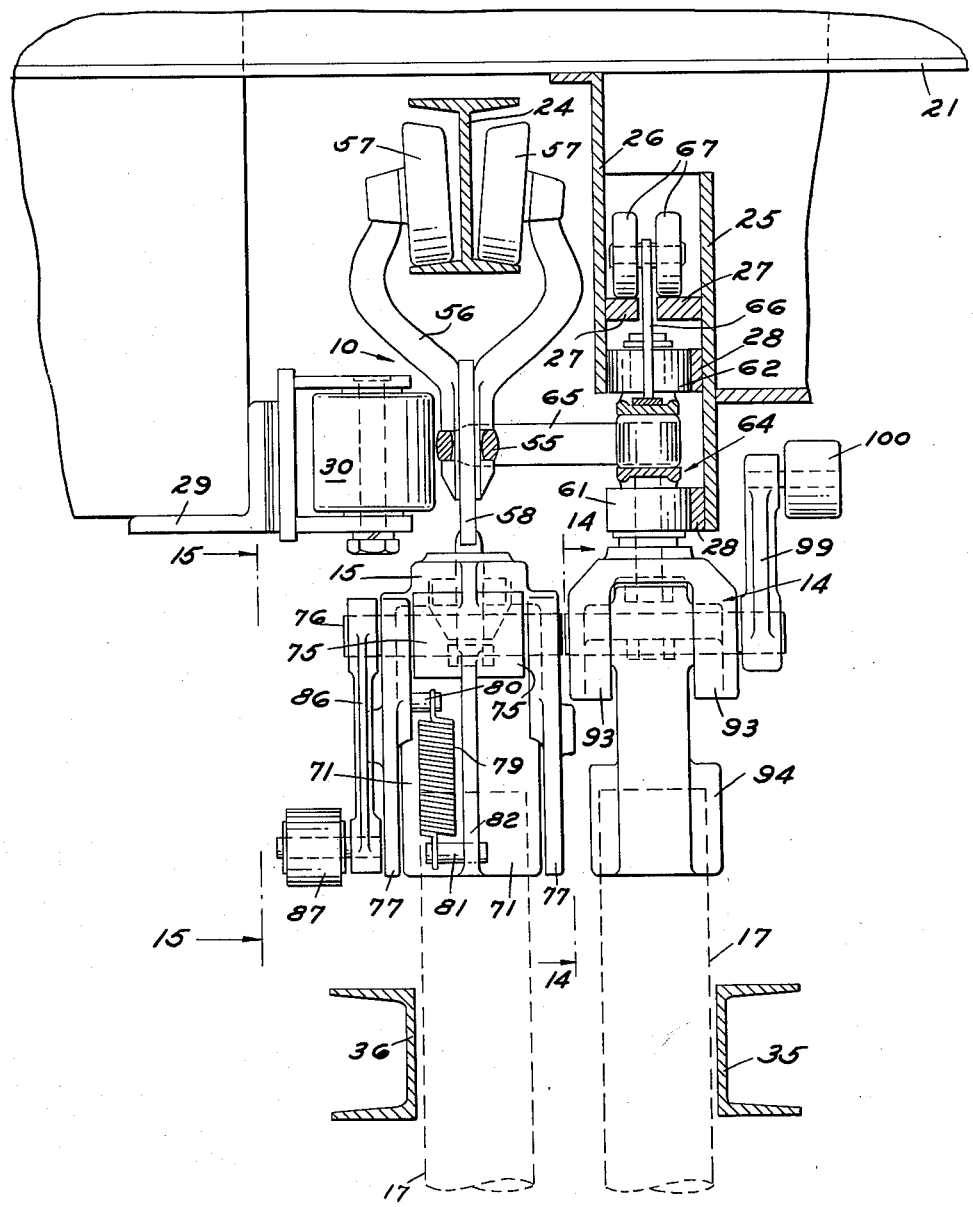

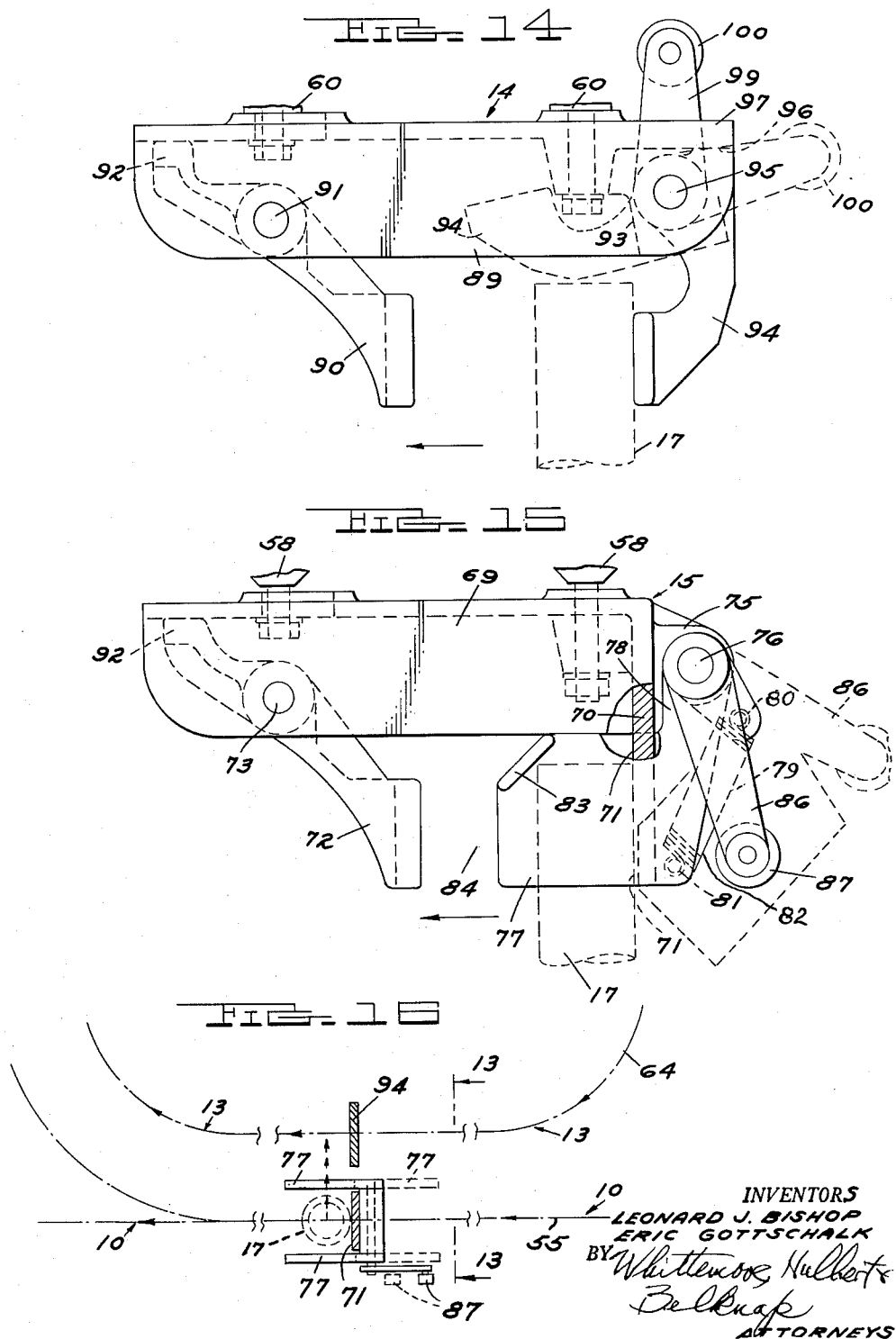

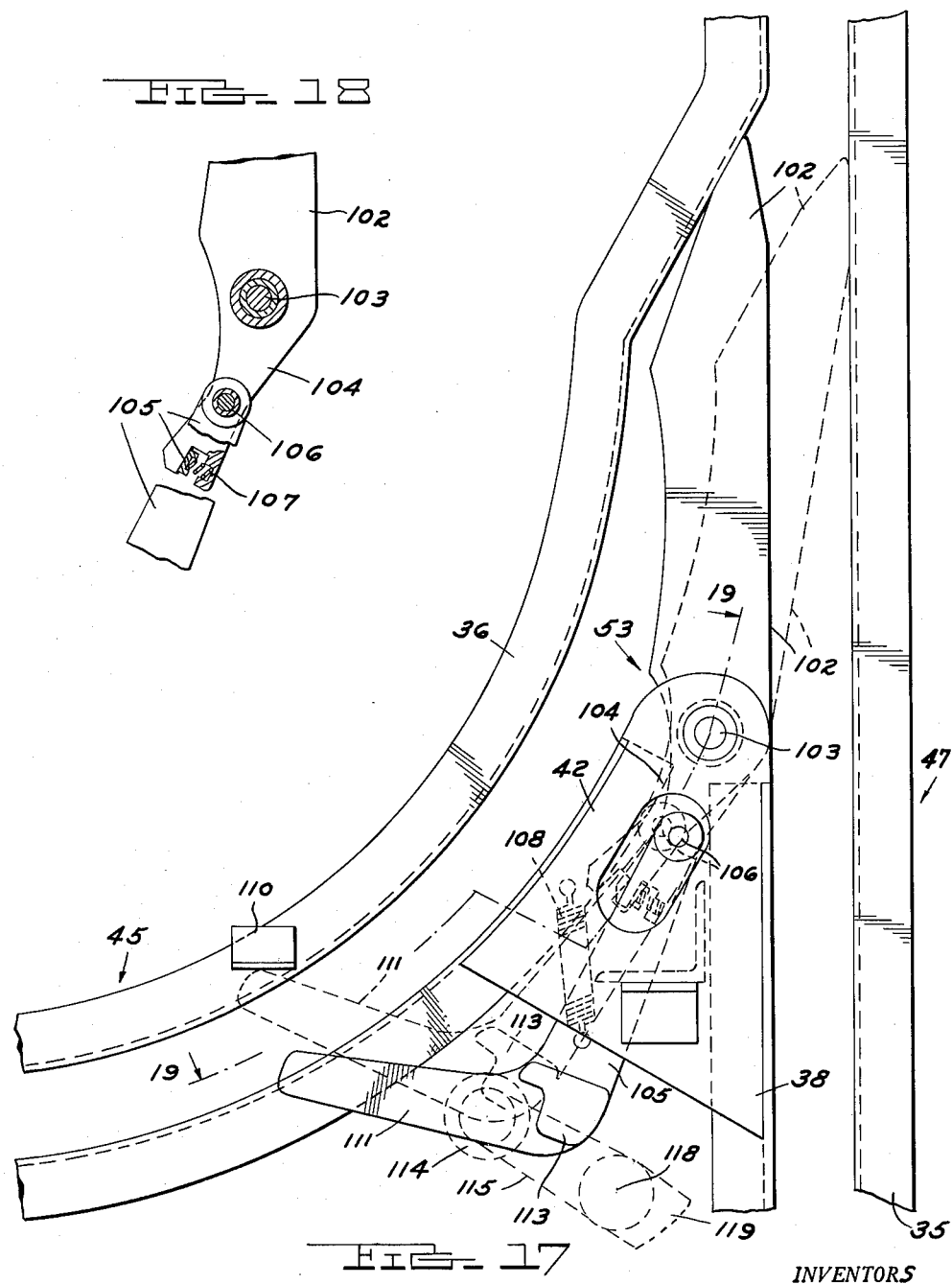

May 2, 1961  L. J. BISHOP ET AL  2,982,228
OVERHEAD TRUCK PUSHER AND DISPATCH SYSTEMS
Filed Sept. 3, 1958  14 Sheets-Sheet 8
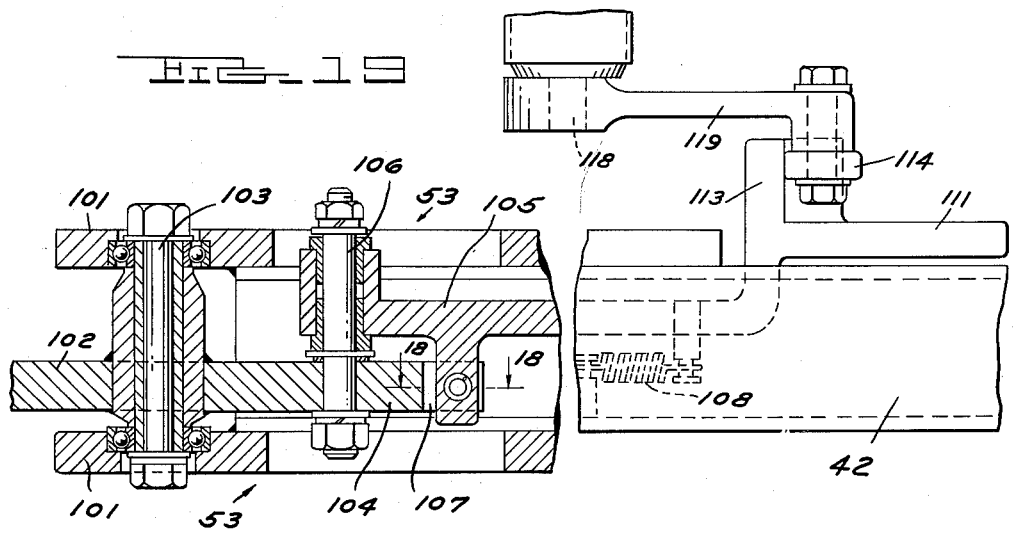
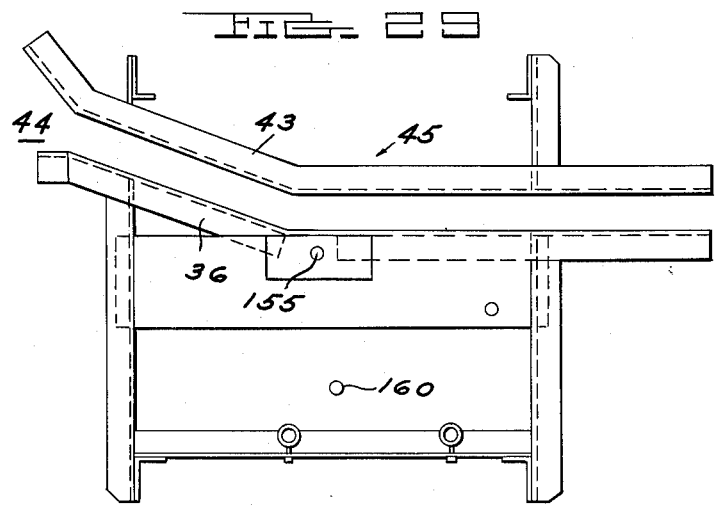
INVENTORS
LEONARD J. BISHOP
ERIC GOTTSCHALK
BY
ATTORNEYS

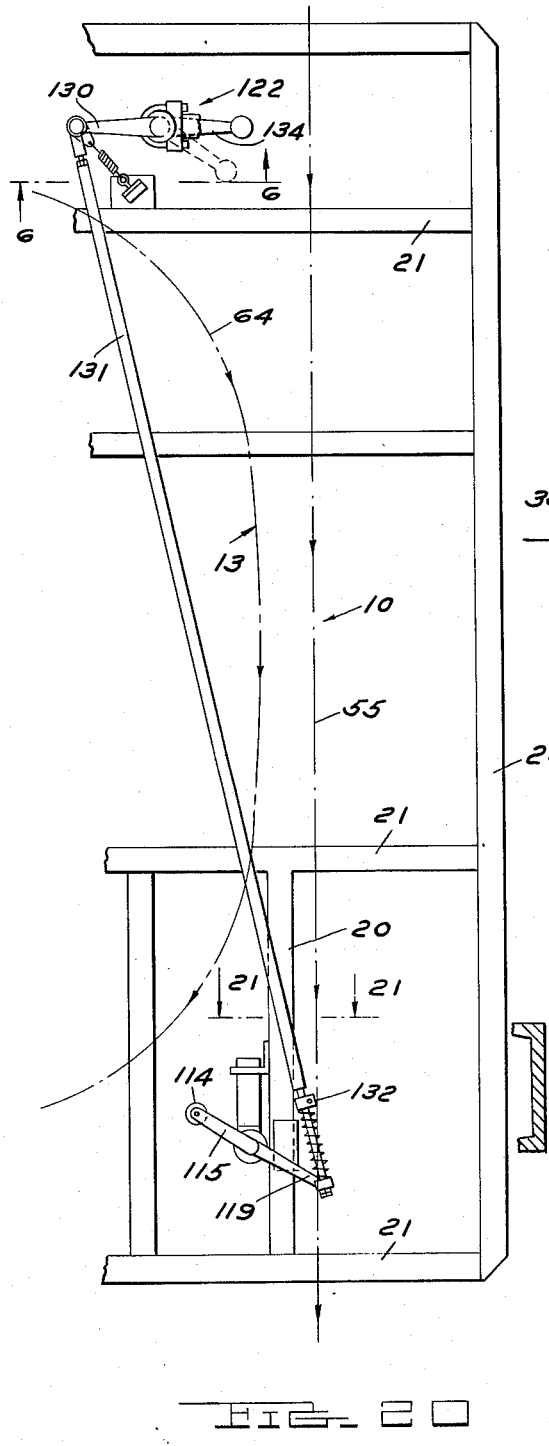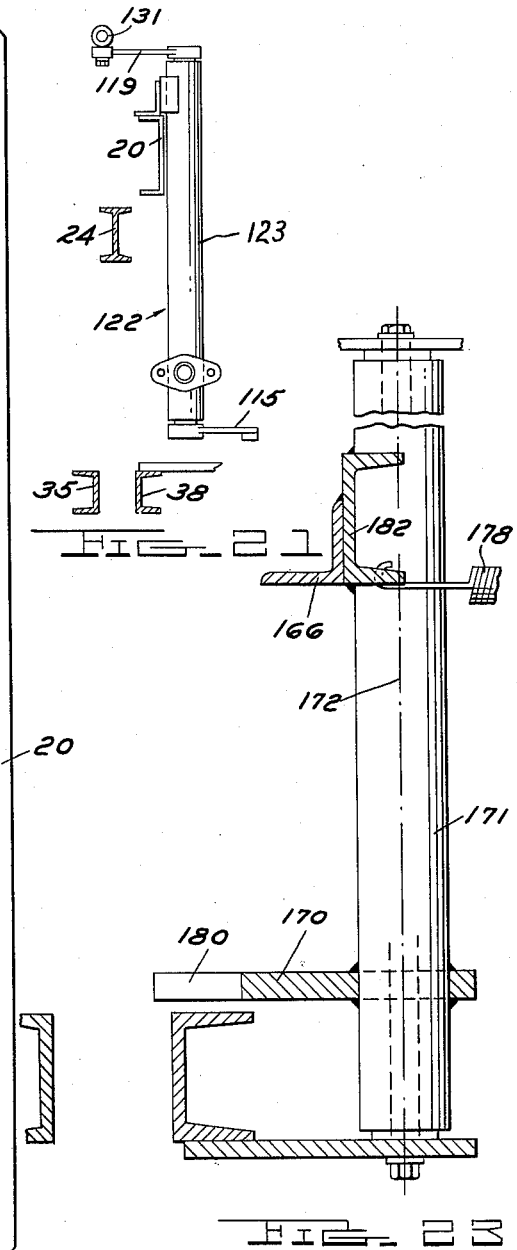

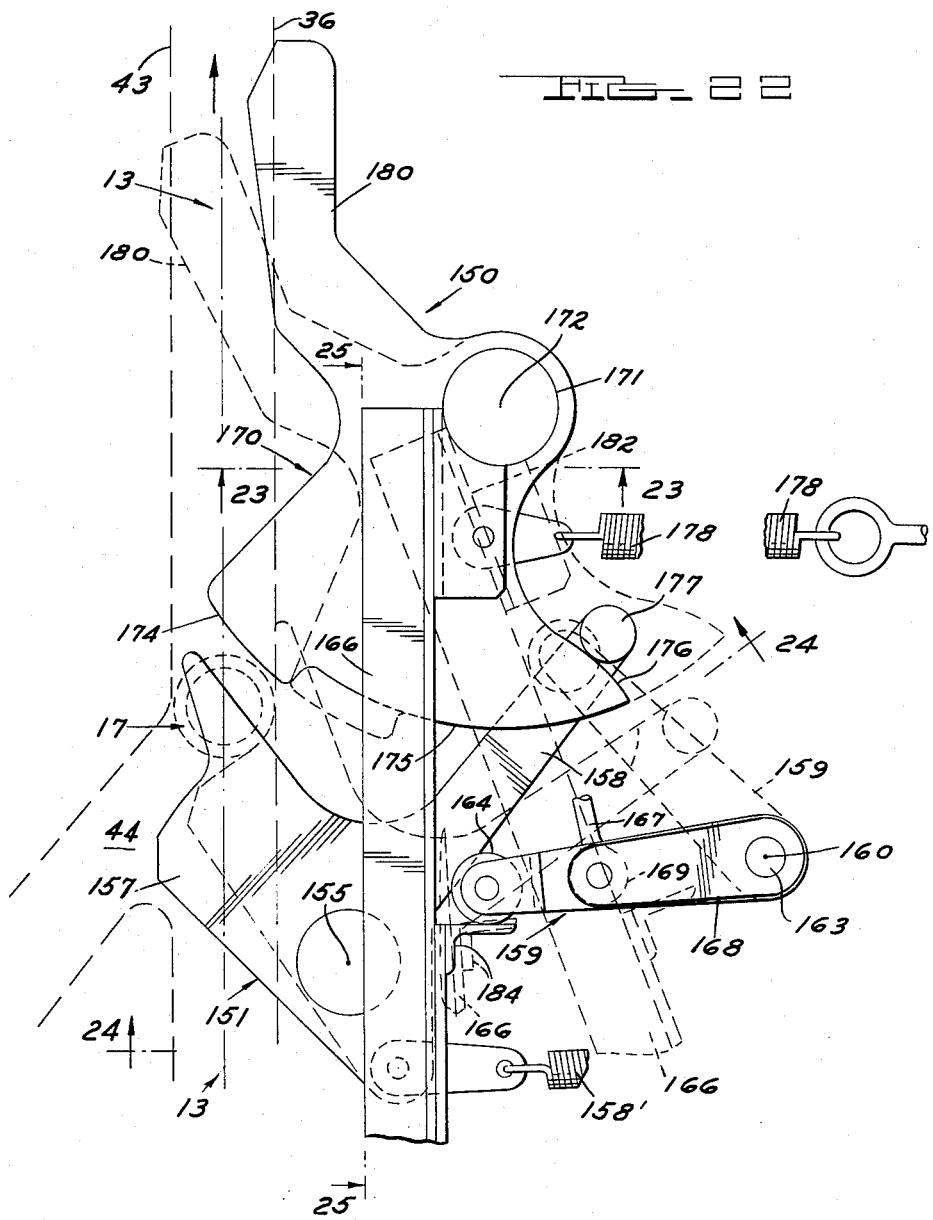

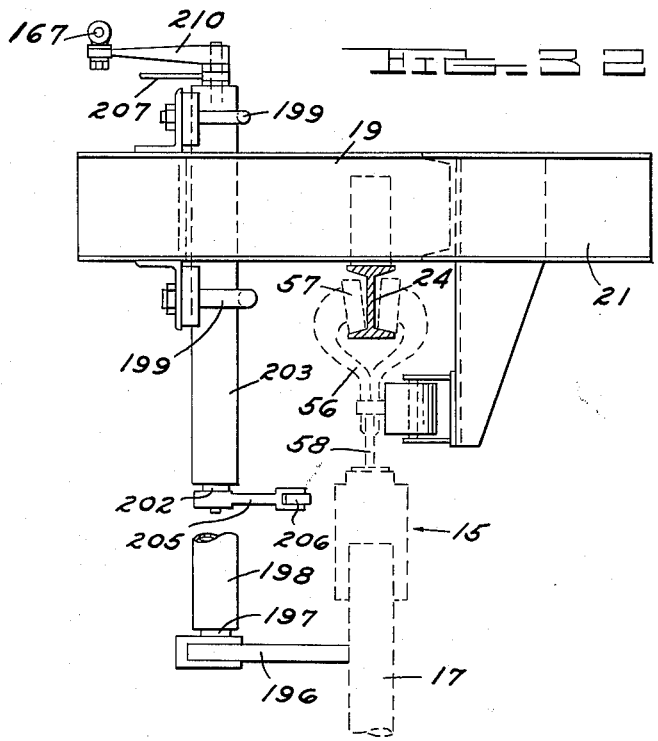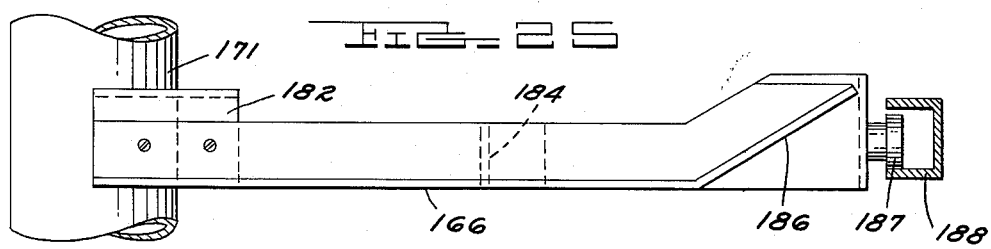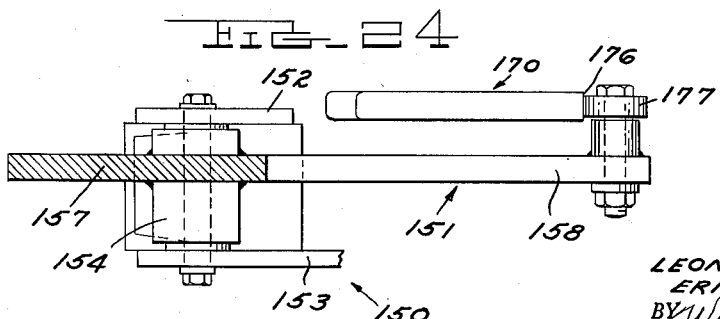

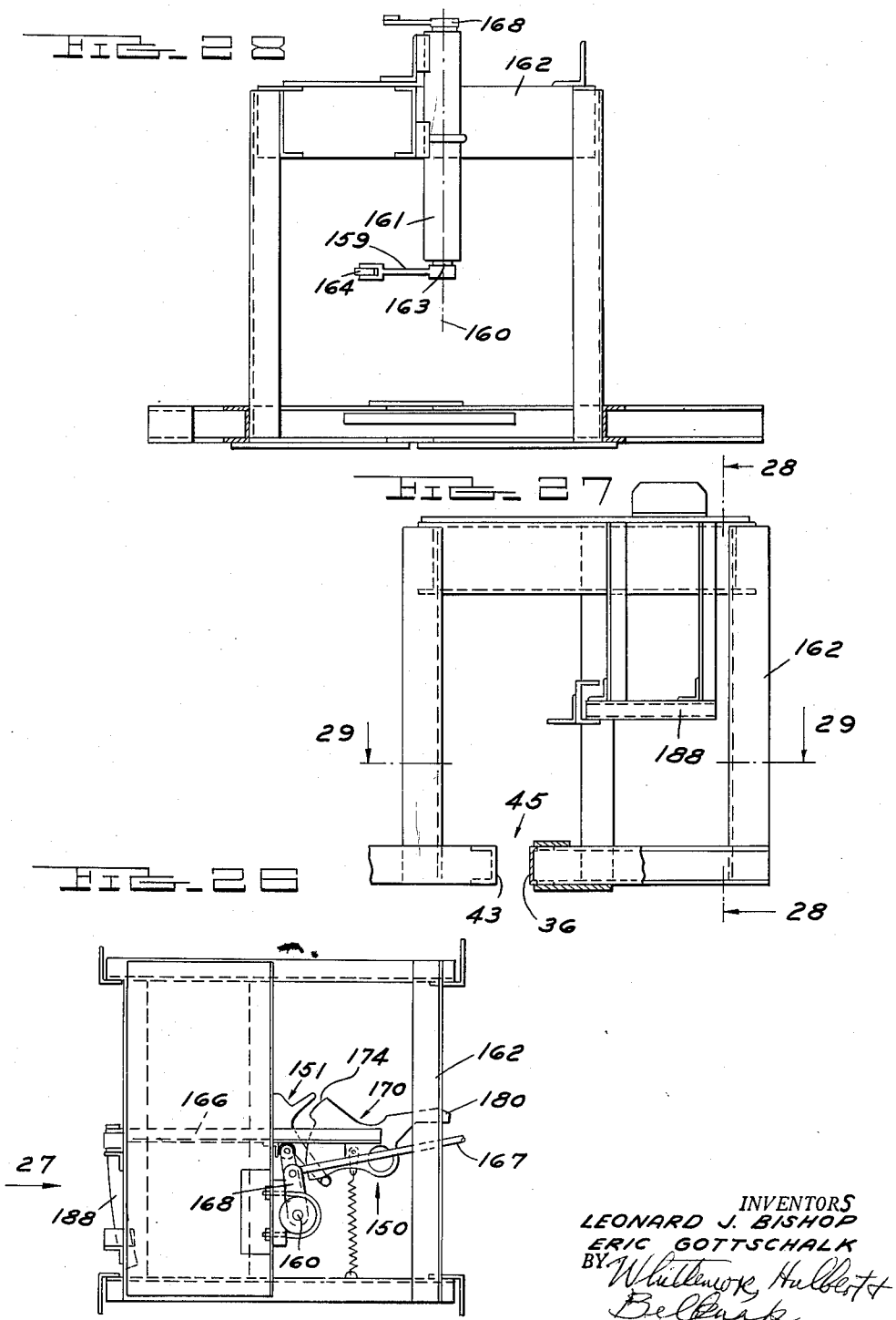

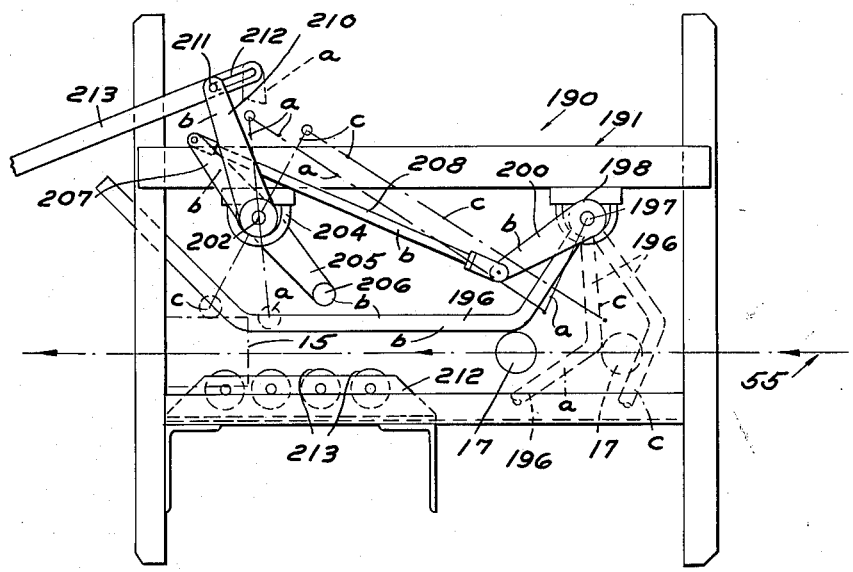
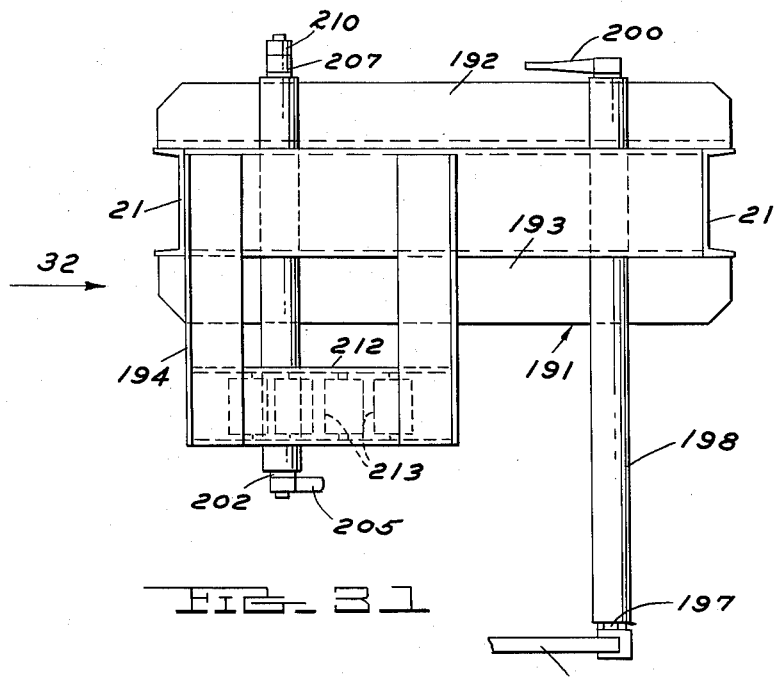

May 2, 1961 L. J. BISHOP ET AL 2,982,228
OVERHEAD TRUCK PUSHER AND DISPATCH SYSTEMS
Filed Sept. 3, 1958 14 Sheets-Sheet 14
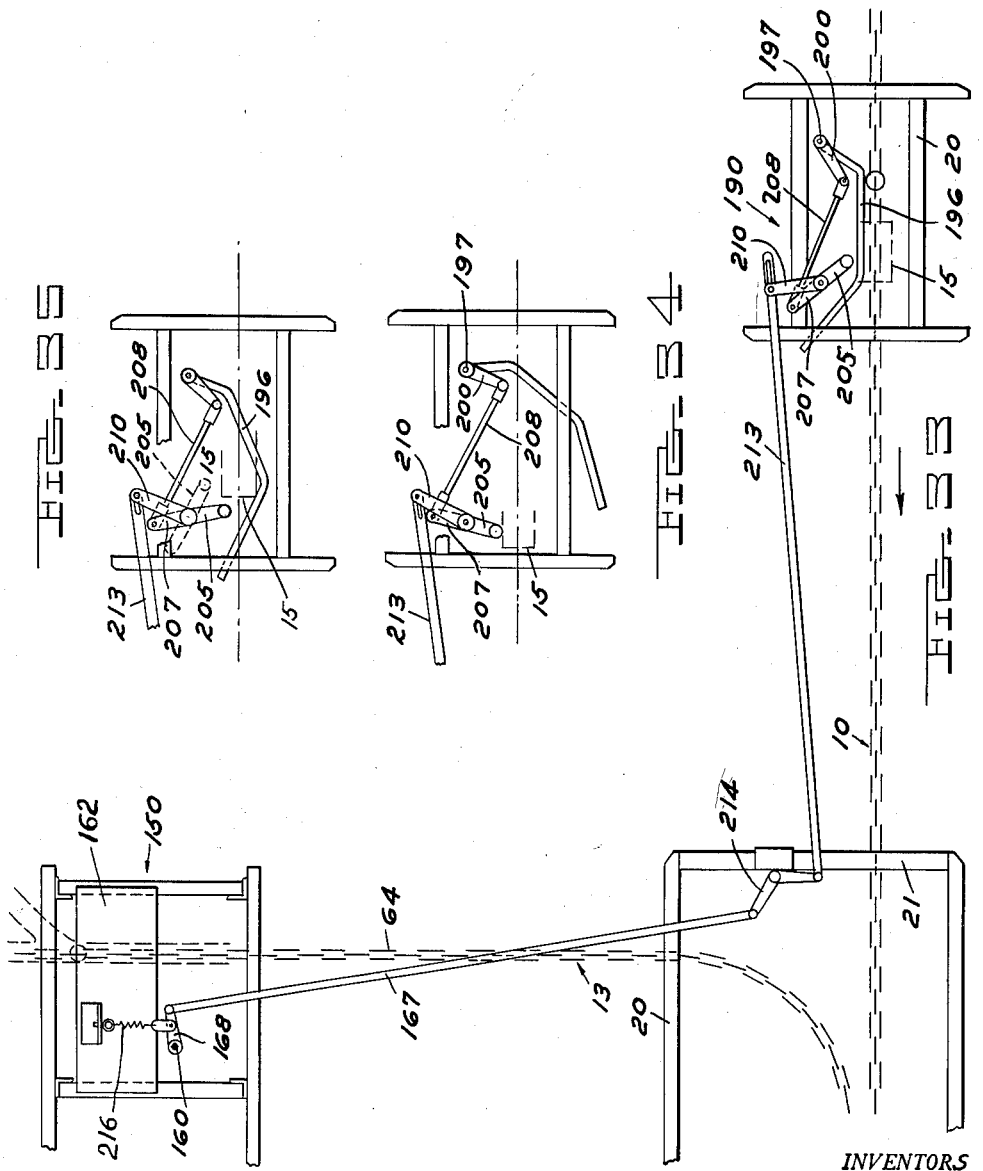
INVENTORS
LEONARD J. BISHOP
ERIC GOTTSCHALK
BY
ATTORNEYS

United States Patent Office

2,982,228
Patented May 2, 1961

2,982,228

OVERHEAD TRUCK PUSHER AND DISPATCH SYSTEMS

Leonard J. Bishop, Birmingham, and Eric S. Gottschalk, Detroit, Mich., assignors to Mechanical Handling Systems, Inc., Detroit, Mich., a corporation of Michigan Filed Sept. 3, 1958, Ser. No. 758,810

21 Claims. (Cl. 104—172)

The present invention relates to improvements in overhead truck pusher conveyor systems for factories and the like, in which freely rolling floor trucks or dollies are propelled along a desired routing by overhead main and transfer chain mechanisms engageable with a rigid upright mast on the truck.

A system of this general sort constitutes the subject matter of a copending application of Paul Klamp, Serial No. 551,088, filed December 5, 1955, now Patent No. 2,949,862, August 23, 1960.

It is a general object of the invention to provide an improved truck type conveyor system in which an improved coordinated and synchronized drive of chain type main and branch or transfer conveyors each equipped with a series of mast-engaging load bars, enables the switching of the truck from one conveyor to another in a highly efficient manner. This is done under the control of appropriate switching means without diminution of the speed of travel of the truck, and without any need for special mechanism to coordinate the starting, stopping, acceleration or de-celeration of the transfer chain conveyor relative to the main conveyor. Further, the transfer is effected without any possibility of jamming of two trucks at the zone of re-entry or convergence of the transfer unit relative to the main line, whether through lack of proper timed coordination of the respective conveyors, or of power failure, or the like, and without possibility of improper operation due to problems introduced by truck inertia.

In explanation of these matters of advantage, it has heretofore been proposed to guide mast-bearing floor trucks into and out of branch or transfer lines without resort to any switch means, as for the purpose of storing material on the truck pending return to the main line, or of performing operations of one sort or another upon the load of the truck, etc. This method is, of course, uncertain and unreliable as to operation, requires constant supervision by personnel, involves a factor of danger, and is otherwise undesirable.

It has also been proposed to employ in conjunction with a main pusher conveyor line a transfer line to which trucks may be shunted under the control of a mechanical switch, being propelled positively on both lines by load bars carrying mast-engaging dogs. In an existing system of this kind, the transfer chain is intermittently driven when needed, being started by signal from a truck advancing on the main line, or otherwise. However, in the event the speed of the main line changes substantially (as is often the case) all of the drives for the individually operated transfer conveyors require adjustment to maintain a desired relationship of their respective load bars. Furthermore, considerable wear and tear on the mechanism results from intermittent and frequent initiation and termination of operation of the transfer conveyors, with the heavy weight of the trucks and their loads introducing inertial considerations often difficult to overcome. In the event of a power failure, the intended driving relationships of the main conveyor and the transfer conveyors is thrown awry, requiring time-consuming maintenance in the re-establishment of the system.

The above identified Klamp copending application discloses a system in which at least one of the faults of the others is met and overcome, in that the transfer conveyor is operated controlledly so that its mast pusher members overcome a mast of a truck propelled by a main conveyor and advance it onto a divergent branch or transfer line, the movement of both main and transfer conveyors being continuous and uninterrupted. Furthermore, the transfer conveyor is driven positively and directly from the main conveyor chain as its one source of power. This insures reliable and co-ordinated operation of the two conveyors in synchronism under all conditions, and thus a further drawback in existing installations is overcome.

It is an object of the present invention to go a step further in this direction of improvement by providing an overhead truck pusher system having transfer conveyors which are driven positively by "caterpillar" engagement with the main overhead conveyor chain, the two conveyor chains being thus permanently interlocked so that if one halts the other does; and in which, moreover, the load bars of the two chains, on which mast propelling dogs are carried, are exactly interrelated as to longitudinal position and spacing, so that in entering an exit switch zone, in which the mast is to be diverted from the main line to a branch or transfer line by a mechanical switch, the respective main and transfer conveyor load bars travel in exact side by side relationship, for a purpose to appear.

More specifically, it is an object to provide an arrangement of this sort in which the truck mast remains under the control of a main conveyor load bar in traversing the switch zone, in the absence of an advance mechanical signal to the switch, but is diverted by the switch onto the transfer conveyor load bar when such a signal is forwarded to the switch, swinging the latter from a straight-through to a switching or diverting position. In this transfer operation the mast, under the control of the switch, simply slides across and off the propelling face of the dog of the main line conveyor and onto the corresponding propelling face of the load bar of the transfer conveyor.

It is seen from the above that the invention provides a transfer operation that is not reliant upon the starting and stopping of a transfer conveyor, the transfer conveyor having a direct and interlocked drive from the main conveyor; in which it is not necessary to delay the transfer until one conveyor dog or load bar overtakes another and picks the truck mast of the latter; in which interlocked, "caterpillar" type action insures the unfailing transverse alignment of the respective load bars for the desired action; and further, in which problems of wear and tear on parts and inertia are eliminated by the continuous, synchronized movement of the sets of main and transfer conveyor load bars.

Another specific object is to provide a system featuring main and transfer load bars aligned transversely in traveling along a switch zone as described, in which the mast of a truck propelled by the main conveyor is, during a portion of its traverse of said zone, laterally confined between a pair of swingable control or restraining ears on the load bar. Provision is made during each such movement of the mast to swing these ears out of restraining relation to the mast, whereby upon operation of a switch in response to an advance signal, the switch will divert the mast from the main conveyor load bar dog onto the transfer conveyor load bar dog as described. If not so diverted, the control ears return to restraining relation to the mast in its further advance along the main line.

A still further object is to provide a system in which the operation of the load bar control ears is occasioned by a track cam paralleling the travel of the mast through the switch zone.

Yet another object is to provide a system as described, in which the mechanical advance signaling to the switch zone is under the control of a selectively adjustable flag arrangement on the truck mast, transmitted through a simple type of rocker arm and link arrangement to the switch.

In the system of the invention the transfer conveyor diverts the truck to a free destination point, at which it departs from propelling control by the transfer load bar. The system is also featured by a waiting station, at which the truck is manually returned to the control of the transfer conveyor.

A general object is to provide a system of this sort having improved means for insuring that no such truck shall be so returned unless there is a load bar of the main conveyor approaching the switch zone and unburdened by a truck mast; and in accordance with this object, the system includes an improved, so-called "empty place spotter" unit operatively connected to an improved truck mast halting and release mechanism at the waiting station.

This mechanism is automatically resettable by the mast of the truck whose re-entry is thus controlled, and its operation is such that, not only will a truck mast not be picked up to the transfer conveyor for return unless the proper mechanical signal is received from the empty place spotter unit, but also that the mechanism, conversely, will not be operated unless a truck mast is present in position to be picked up, thus affording the necessary means to reset the mechanism.

Another more specific object is to provide a system of the class described, in which the empty place spotter unit comprises, respectively, a lever operated mechanically by the mast of a truck advancing on the main line to disable the spotter from initiating an operating signal to the mechanism of the waiting station, in this event, and a roller arm operated by the load bar of the main line. In the event no mast is present, this operation insures the desired signal to the waiting station mechanism.

Yet another and more specific object is to provide a system in which, when a truck mast occupies the advancing main line load bar, hence actuates the lever mentioned above, the roller arm is shifted out of position to be engaged by the load bar in question, hence forwards no signal to the waiting station.

A still further specific object is to provide a system having an empty place spotter unit and re-entry control mechanism as described, in which the mechanical hookup from the former to the latter serves to operate a control cam track at the waiting station, the function of which track is to periodically elevate a mast engaging and propelling dog of the load bar of the transfer conveyor out of position to engage and pick up the mast of a waiting truck. The cam track in question is shifted by the empty place spotter signal out of position to occasion this movement of the dog; and the latter, with assurance that an unoccupied main conveyor load bar is advancing, proceeds to propel the mast around the transfer line to a point of re-entrance of the main line, at which point the dog comes into the transversely aligned relation to the main conveyor load bar dog which has been referred to above.

The foregoing as well as other objects will become more apparent as this description proceeds especially when considered in connection with the accompanying drawings illustrating the invention, wherein:

Fig. 1 is a schematic top plan view of a factory or like installation of a truck pusher conveyor system according to the invention, various transfer lines of generally similar nature being shown in association with a main conveyor chain or line;

Fig. 2 is a front elevational view of a typical mast-equipped floor truck controlled in its routing by the system, with overhead frame or superstructure and track provisions shown in transverse vertical section;

Fig. 3 is a top plan view, partially broken away, showing a typical layout, as to its mast guide track structure and supports, of a transfer conveyor unit;

Figs. 4 and 5 are, respectively, views in enlarged scale and in transverse vertical section along lines 4—4 and 5—5 of Fig. 3;

Fig. 6 is a fragmentary elevational view of an advance mechanical signal station of the individual unit of the system, as from line 6—6 of Figs. 3 and 20;

Fig. 7 is a top plan view of the corresponding transfer conveyor guide structure of the unit, in relation to main conveyor track and chain backup provisions;

Fig. 8 is a view in vertical transverse section along line 8—8 of Fig. 7;

Fig. 9 is a view in horizontal section along line 9—9 of Fig. 8, being in larger scale and more clearly illustrating certain exit switch and load bar lift cam features;

Fig. 10 is a fragmentary view in enlarged scale of a truck mast and adjustable signal flag means thereon;

Fig. 11 is a view in enlarged scale and horizontal cross section along a line generally corresponding to line 11—11 of Fig. 10;

Fig. 12 is a fragmentary view in vertical section along a line corresponding to line 12—12 of Fig. 11;

Fig. 13 is an enlarged fragmentary view in transverse vertical section, as viewed, for instance, from a line corresponding to line 13—13 of Figs. 3 and 16, showing main and transfer conveyor chains, with associated controls, load bars and mast propelling dogs in a transversely tandem relation in which they travel in a switch zone of the system;

Fig. 14 is a fragmentary elevational view of the transfer conveyor load bar, as viewed from line 14—14 of Fig. 13;

Fig. 15 is a similar fragmentary view of the elevation of the main line conveyor load bar, as viewed from line 15—15 of Fig. 13;

Fig. 16 is a schematic plan view to illustrate the relation of main and transfer conveyor chain centers, as they traverse the switch zone, and the action of the system in transferring the truck mast from the former to the latter;

Fig. 17 is a fragmentary top plan view of an exit switch unit of the system, by which trucks are diverted from the main to the transfer line;

Fig. 18 is a fragmentary view, partially broken away and in section along line 18—18 of Fig. 19, of a lost motion connection between the switch tongue and its control arm of the switch of Fig. 17;

Fig. 19 is a fragmentary view, partially broken away and in vertical section along a line corresponding to line 19—19 of Fig. 17;

Fig. 20 is a fragmentary top plan view showing an advance signal station or unit of the system and linkage connecting the same for the operation of the switch of Figs. 17, 18 and 19;

Fig. 21 is a view in transverse vertical section along line 21—21 of Fig. 20;

Fig. 22 is a fragmentary top plan view of an improved control mechanism of the system, to govern the return of a truck to the main line in properly timed relation to a load bar of the latter;

Figs. 23 and 24 are, respectively, views in transverse vertical section along lines 23—23 and 24—24 of Fig. 22;

Fig. 25 is a fragmentary view in side elevation, as from line 25—25 of Fig. 22, showing a cam track operated at the waiting station under the control of the empty place spotter unit of the system, with provisions for guiding and vertically restraining the track in its movement;

Fig. 26 is a top plan view of superstructure or framework pivot means at the waiting station of the system;

Fig. 27 is a side elevational view, from the direction of the arrow 27 of Fig. 26;

Figs. 28 and 29 are, respectively, views in vertical and horizontal section along lines 28—28 and 29—29 of Fig. 27;

Fig. 30 is a top plan view of the empty place spotter unit of the system, showing its mast-operated control lever and load bar operated roller arm in various positions thereof, one position of these respective parts being depicted in solid line and other positions being simply indicated by theoretical center lines and connecting pivot axes;

Fig. 31 is a fragmentary elevational view of the empty place spotter unit, as from the bottom of Fig. 30;

Fig. 32 is an elevational view of the same unit, as in the direction of the arrow 32 of Fig. 31;

Fig. 33 is a schematic top plan view showing the empty place spotter unit as link-connected to the truck mast control mechanism at the re-entry awaiting station; and Figs. 34 and 35 are fragmentary views showing the parts of the empty place spotter unit in two positions other than that shown in Fig. 33.

Fig. 1 of the drawings shows a typical factory installation of the system of the invention, including transfer units "A," "B," "C," "D" and "E" and arranged longitudinally along and on either side of an endless main conveyor line 10, the nature of which is hereinafter described in detail. This conveyor may be varied as to length or outline, as indicated by dotted line in Fig. 1, may extend from room to room or through walls 11 separating the same, and it is endless in nature, being conventionally driven by engagement with a suitable "caterpillar type driver 12 which is powered in any appropriate fashion. This source serves to power all of the various conveyor units "A" through "E," because of a similar interlocked driving relationship of the respective endless transfer conveyors 13 of the latter with the conveyor 10.

Although the specific outline of the respective conveyor units may vary, their general composition is identical, therefore, a unit such as the unit "B" may be taken as typical for the description of the system to follow.

The reference numerals 14 generally designate the load bars of the transfer conveyor 13, while the reference numeral 15 correspondingly designates in a general way the load bars of the main conveyor 10, and it is to be understood that one of the functions of the transfer conveyor unit "B" is to insure, on appropriate mechanical signal from the floor truck 16 (Fig. 2) whose upright mast 17 is propelled by the main conveyor 10, that this mast will be picked up by the transfer conveyor and transported to a discharge zone out of the orbit of the latter, where it is manually moved as desired. Another function is to insure the properly timed re-entry of a truck, under propulsion by a transfer conveyor load bar 14, to the main conveyor line, in the coordinated relationship mentioned above.

The operation of the system, as initiated by a signal flag device 18 on the truck mast 17, is controlled in its entirety by load bar supported, cam follower means, advance signal means, waiting station re-entry control means, empty place spotter means, etc., all supported by an overhead superstructure of the general sort employed in overhead trolley conveyor systems. It is difficult to pictorially depict all of such structure with clarity in a single view of the drawings, hence details of such structure are best studied in figures of the drawings dealing with the particular operating means, mechanism or unit supported or guided thereby. However, preliminary reference may be made to Figs. 3, 4, 5, 7 and 9 for certain features of the fixed overhead structure and their relationships to one another.

The superstructure or framework referred to generally comprises a system of longitudinally and transversely disposed horizontal channels 20, 21, respectively, appropriately supported from above, with other suitable rigid angle iron hanger members 22 sustained thereby. Certain of the transverse frame members 21 support a main line monorail track 24 immediately therebeneath, in the form of an I-beam centered above the center line of the main line conveyor 10 and co-extensive in length with the latter. This track sustains the main conveyor and the series of longitudinally spaced main line load bars 15 of the latter in the manner shown in Fig. 13 and as will be hereinafter described.

The frame members 20, 21 and hangers 22 also coact, as shown in the sectional views of Figs. 4, 5 and 8, in supporting and guiding the transfer conveyor load bars 14 (Figs. 1 and 13), and to this end the members in question are equipped with suitable vertically disposed, laterally spaced plates 25, 26 carrying transfer trolley supporting tracks 27. The plate member 25 is also provided with vertically spaced, continuous horizontal backing strips 28 for certain vertically journalled guide rollers of the transfer conveyor load bars, to be described.

A pair of frame hangers 22 support, at the approximate elevation of the tracks of the backing strips 28, an angle iron 29 paralleling the main conveyor track I-beam 24, on which angle iron a longitudinally spaced series of backup rollers 30 (Figs. 7, 8 and 13) for the power chain (to be described) of the main line conveyor 10. At a somewhat lower elevation, the last mentioned hangers 22 have brackets 32 secured thereon supporting an angle iron 33 which serves as a side guide for the main line load bars; and at their lower ends the hangers 22 have suitable further brackets 34 supporting side guides 35, 36 of channel cross section for the masts 17 of the trucks 16. The guide 35, as shown in Fig. 9, guides an outer side of the mast as it traverses a switch zone "Z" of the unit of the system under consideration, while guide 36 actually constitutes part of the mast guide provisions of the transfer conveyor part of the unit. As shown in Fig. 9, the means for guiding the truck mast as it enters the approach to the switch zone "Z" is constituted by a further channel guide 37 for the opposite or inner side of the mast; and the guide of the mast is resumed upon departure from the switch zone by a further guide channel 38 similarly spaced from the continuous guide channel or bracket 35.

In respect to the mast guide provisions of the transfer conveyor, it is seen by reference to Fig. 3 that the channel member 36 referred to above continues longitudinally laterally in the general form of a 90° turned U, terminating at a discharge throat 40 of the transfer conveyor structure, prior to arriving at which throat the truck mast passes out of the control of the transfer conveyor load bar 14, and is advanced manually as further desired. The dot-dash line and arrows in Fig. 3 indicate the orbital path of travel of the center line of the transfer conveyor, as viewed in plan.

A second channel shaped guide member 42 parallels the guide 36 from the switch zone to the discharge throat 40; and a similar guide member 43 parallels the other leg of the guide 36, extending in the opposite direction from the transfer zone "Z" to the area of a waiting station, designated 44, at which it terminates in flared divergent relation to the inner guide member 36. This channel-constituted transfer guide arrangement for the truck mast is hereinafter generally designated by the reference numeral 45, and the corresponding mast guides for the main line conveyor are hereinafter generally designated 47.

As shown in Fig. 9, the reference numeral 49 designates a control cam track governing the action of the main conveyor load bars 15 as they enter, traverse and exit from the switch zone "Z," which action will be hereinafter described. For the present it suffices to point out that the cam track 49 includes an upward slope 50 at the incoming side, a downward slope 51 at the outgoing side, and an intermediate horizontal lift portion 52. The reference numeral 53 in Fig. 9 generally designates an exit switch governing the diversion of truck masts from the main line 10 to the transfer line 13, as will be described.

Conveyor and load bar structure

Now referring to Figs. 13, 14 and 15 for a disclosure of the above captioned structure in association with track and guide means of the character described, the main line conveyor 10 is constituted by a main power chain 55 (powered by the "caterpillar" mechanism 12 of Fig. 1) with which a series of main overhead power trolleys 56 are articulated, in a known manner. These trolleys are of yoke-like character, supported by load rollers 57 traveling the lower flanges of the overhead I-beam track 24. Each main conveyor load bar 15 is equipped with a pair of front and rear swivel suspending plates 58 (Figs. 13 and 15) which are suitably supported by spaced links of the power chain 55, with open links of this chain intervening between the load bar supporting links. The outer side of the main or power chain 55 is backed up by a series of backup rollers 30, referred to above and also shown in Figs. 7 and 8.

As for the transfer conveyor load bars 14, referring now to Figs. 13 and 14, they are each provided with a pair of upwardly extending, vertically journalled front and rear guide rollers 61 which roll against the lower backing strip 28 of the frame plate 25, and, in vertically spaced relation to the rollers 61, with a pair of similar anti-friction rollers 62 which roll against the uppermost backing strip 28 of this plate. In the vertical space between the rollers 61 the load bars 14 are articulated to an endless chain 64 of the transfer conveyor 13, and this conveyor chain 64 is equipped, at longitudinally spaced points therealong, with rigid power takeoff lugs 65 projecting laterally thereof, for a purpose to be described.

Each transfer conveyor load bar 14 is equipped with a pair of supporting plates 66, which extend upwardly between the laterally spaced roller tracks on the respective frame plates 25, 26, the plates 66 having journalled thereon a pair of track rollers 67 which ride the respective tracks 27.

It is of the essence of the invention that the upper takeoff lugs 65, by which the transfer conveyor chain 64 is driven from the main power chain 55, extend into mesh-like engagement with open links of the main power chain 55; and that the transfer conveyor load bars 14, as thus positively driven from the main conveyor 10, be so spaced and positioned longitudinally as to come into exact transverse alignment with the main line load bars 15 (refer to Fig. 16) as the two load bars come into and travel along the switch zone "Z," for a reason to appear. This, of course, signifies that the longitudinal spacing of the load bars 14 on transfer conveyor 13 be the same as or a multiple of that of the load bars 15 on the main line conveyor 10.

As shown in Fig. 15, each load bar 15 comprises a body 69 in the form of a casting or stamping of inverted U-shape in cross section, the walls of which are connected at the rear by a vertically elongated cross member 70, the lower extension 71 of which projects beneath the load bar body 69 and acts as a propelling dog for the truck mast 17, as will be described. A forward restraining dog 72 of a conventional sort is pivoted at 73 between the side walls of the load bar body 69, being counterweighted for clockwise rotation. The rear cross piece 70 carries a rearwardly extending center boss 75 pivotally mounting a transverse horizontal pin 76, and, as shown in Fig. 13, a pair of like side restraining ears 77 are secured on this pin, one at either side of the boss 75, to rotate therewith; the pivotal connection is made by an upward extension 78 of each ear 77. A coil spring 79 is connected at one end of a fixed pin 80 on one of the ears 77 and at its opposite end to a similar pin 81 on a rib 82 integral with the fixed dog extension 71 of the body 69, thus acting to urge both side restraining ears 77 in clockwise direction, as viewed in Fig. 15. As thus urged, lug members 83 on the ears 77 engage the side walls of the load bar body 69 to limit the movement in this direction.

As shown in Fig. 15, the gap at 84 between the rear of the forward restraining dog 72 and the front edges of the side restraining ears 77 is less than the diameter of the mast 17, so that with the load bar 15 in the operative condition shown in Fig. 15, it is impossible for the mast to pass laterally out of the restraint of the ears 77.

An operating arm or lever 86 is secured to the outer end of the pivot pin 76 for the side restraining ears 77, the arm 86 extending downwardly to the rear and being equipped with an anti-friction cam follower roller 87 at its lower end. It is the function of this arm and roller, in engaging the cam track 49 shown in Fig. 9 each time an advancing main line load bar 15 comes into the switch zone "Z" of the unit, to swing the side restraining ears 77 to the rear and in counterclockwise direction, as indicated in Fig. 15, the direction of advance of the load bar being indicated by the straight line arrow. Thus, as each load bar 15 traverses the switch zone, its restraining ears 77 are elevated to the rear and upwards, out of restraining relation to the truck mast 17; and the latter may be diverted into the transfer part of the system, where it comes under the driving control of a transfer conveyor load bar 14. The diversion is effected through the agency of the switch 53, details to be described.

In further reference to the transfer conveyor load bars 14, each comprises a body 89 generally similar to the body 69 of the main line load bar 15. A forward restraining dog 90 is pivoted at 91 between the side walls or flanges of this body, being counterweighted for clockwise movement, and such movement being limited by engagement of a stop lug 92 of the dog with the upper part of the body. This is also the case in connection with the dog 72.

Load bar 14, as shown in Figs. 13 and 14, has a pair of side bosses 93 at its rear end, between which a propelling dog 94 is pivoted by means of a cross pin 95. Dog 94 is provided with a top heel or abutment portion 96 above and to the rear of its pivot pin 95, as viewed in Fig. 14, and its heel is engageable with a rear extension 97 of body 89 to limit counterclockwise motion of propelling dog 94 from the operative propelling position thereof shown in Fig. 14.

The dog 94 is, like the restraining ears 77 of the main line load bar 15, given an intermittent motion about its pivot, but by different and selectively adjustable means associated with a control mechanism at the waiting station 44 (Figs. 3 and 22). For this purpose, the dog 94 is fixed on its pivot pin 95, which rotates in the bosses 93, and a projecting end of the pin has secured thereto an upwardly extending crank arm or lever 99, to the outer end of which an anti-friction cam track follower roller 100 is applied.

Upon recurrent engagement of the roller 100 with a cam track of the waiting station control mechanism to be described, the propelling dog 94 is swung forwardly and upwardly, or clockwise, about its pivot pin 95, thus to clear the dog vertically above the top of a truck mast 17, to a position within the side walls of the load bar body 89. When this takes place, the transfer conveyor load bar 14 is disabled from picking up a truck placed manually at waiting station 44, and thus advancing the same to re-entry with the main line at the switch zone "Z." However, when the dog 94 is not actuated as described (by withdrawal of the mentioned cam track from actuating position) the dog proceeds to pick up the mast 17 and so advance the truck to the transfer zone.

Exit switch and signal station control unit

Now referring to Figs. 17, 18, 19, 20 and 21 (in conjunction with Fig. 16 for clarity as to the result accomplished), the switch generally designated 53 is of the general type illustrated and described in the copending application of Paul Klamp, Serial No. 601,001, filed July 30, 1956, now Letters Patent No. 2,868,139 of January 13, 1959; and since its specific structural features constitute no part of the invention, reference can be had to that application for such details, and the present description can be made brief. As shown in Fig. 19, switch 53 is mounted between fixed horizontal plates 101 of the superstructure, and comprises a shaped switch tongue 102 (Fig. 17) which in the solid line position of that figure is in an inoperative, straight-through or non-switching position, being shown in dot-dash line in the operative or switching position. It is pivoted by means of a vertical pin 103 or the like at the junction of the main line mast guide channels 35, 38 with the transfer line mast guide channels 36 and 42. Tongue 102 has a rear extension 104 on which a switch tongue control arm 105 is pivoted at 106 by means of a pin. A lost motion connection between the tongue 102 and control arm 105 is effected through a small coil spring 107 interposed therebetween, see Fig. 18.

Control arm 105 is urged in clockwise direction (Fig. 17) about its pivot pin 106 by means of a relatively strong coil spring 108, thereby acting to swing tongue 102, through the lost motion connection, toward its operative or open switching position, shown in dot-dash line in Fig. 17. Attendant motion of the control arm 105 in this direction is limited by a fixed stop 110 engageable by an offset extremity 111 on arm 105. In the dot-dash line position, this offset arm extension extends across the mast guide opening between channels 36 and 42, and as thus positioned it is engaged by a truck mast 17 to reset the switch to its solid line position, an operation similar to that taking place in the mechanism of Klamp Patent No. 2,868,139, identified above.

The switch control arm 105 carries a vertically projecting latch lug 113, shown in solid and dot-dash line in Fig. 17 in the respective positions of switch 53. This lug is engageable by a latch roller 114 (shown in dot-dash line in Fig. 17) carried by a latch arm 115, thus to hold the switch 53 in its solid line, straight-through position. Arm 115 is released from such latch engagement with the control arm 105 under the control of an advance signal station unit (to be described), the arm 115 being pivoted on a fixed axis at 118, and being provided for the purpose with an extension 119 operable by a link of the signal station unit.

Accordingly, with the switch tongue 102 in the operative, dotted line position of Fig. 17, and as the cam track 49 (Fig. 9) swings the arm 86 of the main conveyor load bar 15 counterclockwise (Fig. 15) elevating the side restraining ears 77 from the position shown in solid line in Fig. 16 to that shown in dotted line, the mast 17 engages the switch and is shifted by the latter, in the direction indicated by upright arrows in Fig. 16. The truck is thus transferred from propelling engagement with the dog extension 71 of the load bar 15 to propelling engagement by the dog 94 of the transfer load bar 14. It is propelled by the latter to the discharge throat of the transfer conveyor guide channels, where it is manually moved to any other location desired.

The signal station unit for controlling movements of the switch 53, and its linkage connection to the switch, are best shown in Figs. 3, 6, 20 and 21 of the drawings. The signal station unit is generally designated by the reference numeral 122. It comprises a vertically elongated tube 123 suitably supported by the superstructure framework, at a point in advance of the switch zone "Z" (Fig. 20) and to one side of the longitudinal center line of the main conveyor chain 55. Such means may comprise a suitable bracket 124 welded to the top of the main conveyor I-beam track 24 and supporting a laterally extending, fixed arm 125, which is rigidly secured to the upright tube 123, as by a clamp device 126 surrounding the latter. Generally similar provisions are made in vertically spaced relation beneath this mount, as generally designated 127, in this case being supported by the mast guide channel 37. A vertical rod or shaft 129 is appropriately journalled within the tubular support 123, having a laterally extending arm 130 secured thereto at its upper end above the track superstructure as indicated in Fig. 6. Arm 130 has an elongated operating rod or link 131 pivotally mounted on its outer end, and this rod 131 extends angularly in relation to the main conveyor to a pivotal connection to the end of the latch control arm 119 (Fig. 17) of the switch 53. The operating rod 131 is slidably guided in a fixed bracket 132 on the frame superstructure, as shown in Fig. 20, and a spring interposed between this bracket and the pivotal connection of the rod to the arm 119 serves to urge the latch lever 115 in clockwise direction, as viewed in Fig. 20, i.e., in the direction for engagement with the switch latch lug 113 (Fig. 17) to hold switch 53 in its straight line position of Fig. 17.

Referring again to Figs. 6, 20 and 21, the pivoted vertical rod 129 of the signal station unit 122 has fixed on its lower end a further laterally extending actuating arm 134, at a level somewhat below the upper extremity of the truck mast 17 (Fig. 6). This arm is engageable by a predeterminedly set signal flag 135 of the adjustable signal device 18 on the mast 17 in this general zone of elevation, and beneath the main conveyor guide channels 35, 37, as shown in Fig. 6. As thus engaged by the flag 135, the arm 134 is swung clockwise from solid to dotted line position (Fig. 20) causing the upper arm 130 of signal unit 122 to draw link 131 and thus rotate the switch latch arm 115 counterclockwise. This releases the latch roller 114 from the latch lug 113, and switch spring 108 (Fig. 17) snaps the switch 53 to its dot-dash line switching position of that figure.

*Mast signal device*

It will be understood that this action takes place only when the signal station unit 122 is operated by the mast of a truck 16 which is intended to be diverted to the transfer conveyor line. The adjustable mast device 18 providing for this selective setting is best shown in Figs. 10, 11 and 12 of the drawings. As therein shown, it comprises pairs of like upper and lower brackets 137 bolt-connected at 138 to the mast and extending laterally from opposite sides of the latter. The duplication of these elements is for the purpose of enabling the truck to be diverted in either side direction relative to the main conveyor 10, as indicated in Fig. 1 of the drawings. Each pair of brackets supports the top and bottom of a vertically elongated rod or bar 139 having a vertically spaced series of fixed pins 140 projecting radially from a side thereof.

Each rod is surrounded by one or more selector collar members rotatable relative thereto, each including an inner tubular element 141 cut to provide a circumferentially extending slot 142 opening radially therethrough, and a collar body element 143 of annular form co-extensive in axial length with the collar element 141 and fixedly secured thereto, as by welding.

The collar body element 143, as shown in Fig. 12, is machined or otherwise formed to provide on its inner peripheral wall an axially extending pin receiving slot 144 opening laterally at the bottom of the body to a circumferentially extending recess 145 having an axially upwardly extending locking notch 146.

Accordingly, with the collar member in an angular relation to the series of pins 140 shown in Fig. 11, the collar may be slid axially of the rod 139 to a desired flagging position adjacent an appropriate pin, then swung from the solid line to the dotted line position of Fig. 11, causing that pin to be received in the recess 145, whereupon the collar is dropped to lock the end of the pin in the notch 146, and restrain the collar from rotation.

Each collar 143 carries an integral, radially extending flag 135 for engagement, if properly positioned with the operating arm 115 of the signal station unit 122, in the manner described above.

*Waiting station and re-entry control mechanism*

Figs. 22 through 29 and 33 illustrate a re-entry control mechanism 150 situated in the area of, and above the waiting station 44, at which zone the mast guide channel 43 of the transfer structure diverges from the coacting inner channel 36, as shown in Fig. 3 of the drawings. It is the function of the mechanism 150, operated under the control of the empty place spotter unit or mechanism to be described, to insure that a truck, manually moved to present its mast 17 at waiting station 44, properly re-enters the main line. In doing this it is picked up and advanced by a load bar 14 of the transfer conveyor 13 for re-entry to the main conveyor 10 only when an approaching load bar 15 of the latter is unoccupied by a truck mast. Thus, the possibility of jamming of trucks at the switch zone "Z" is eliminated.

In order that the operation of control mechanism 150 may be best understood, the empty place spotter unit to be described insures that so long as truck masts pass it, the mechanism 150 will continue to swing the load bar dog 94 of transfer conveyor 13 (Fig. 14) upwardly and out of position to engage the mast 17. The result is that the truck 16 in question remains unmoved at waiting station 44. However, in the event an empty main conveyor load bar 15 passes the empty place spotter (and switch 53 is unlatched to swing to switching position, in the manner described above) the transfer conveyor load bar dog 94 will remain in its operative position of Fig. 14, and the waiting truck mast will be advanced to the switch zone, in properly timed fashion.

As shown in Fig. 22 of the drawings, reference being also had to Figs. 26 through 29 for details of supporting superstructure or framework, the re-entry control mechanism comprises a first latch lever 151 pivoted between a pair of frame-supported plates 152, 153, as shown in Fig. 24, by means of an enlarged cylindrical boss 154 to which the latch lever 151 is welded. The axis of this pivot is designated 155 in the drawings.

The latch lever is of plate-like construction in the rough outline of the letter Y, adjacent the stem or foot of which the pivot member 154 is located, and the two arms 157 and 158 of this lever diverge at an acute angle in the direction toward the top of Fig. 22. A suitable enlarged coil tension spring 158' urges latch lever 151 counterclockwise about its axis 155. The reference numeral 159 generally designates a second latch lever or arm which is pivotally mounted on a fixed upright axis on the framework which is designated 160 (Figs. 22, 26 and 28). This is accomplished by clamping a vertically elongated bearing tube 161 to an auxiliary framework structure 162, with a vertical rod 163 journalled in the tube for arcuate movement. The second latch lever 159 is equipped with a latch roller 164 at its outer end, the function of which is to engage and hold in operative position an elongated cam track member 166; and the function of the cam member 166 is, in turn, to cause the periodic movement of the load bar dogs of the transfer conveyor upwardly and out of position to engage the truck mast, in the event a signal is not transmitted to the mechanism 150 indicating the approach of a main line load bar unoccupied by a truck mast.

In order to impart such signal to the mechanism 150, the second latch lever 159 has a control rod 167 operatively connected in fixed relation thereto, this control rod being worked by the empty place spotter unit or mechanism to be described. In order to effect such operation of latch lever 159, its operating rod or shaft 163 has an operating arm 168 secured thereto above the auxiliary framework structure 162, to the outer end of which arm the control rod or link 167 is pivoted by means of an eye 169 (Fig. 22).

The reference numeral 170 generally designates a third pivotal control member or plate of the re-entry control mechanism 150. As shown in Figs. 22 and 23, the member 170 is of special plate-like form, being welded to a vertically elongated tubular, journal member 171 mounted for arcuate movement in the auxiliary frame structure 162, with the connection of the plate made adjacent the lower end of the journal member 171. The axis of this journal member and of the plate member 170 is designated by the reference numeral 172.

The outline of the control plate or member 170 affords (as shown in Fig. 22) a mast stop face 174 adapted to be engaged by a truck mast 17, as shown in dotted line, when the truck is manually advanced into the waiting station 44, thus holding the truck against further forward movement until signalled. Plate 170 has an arcuate portion 175 extending laterally from the stop face 174, and is then shaped in a generally radial direction to provide a curved latch face 176. This face is latchingly engaged by an integral upright lug formation 177 on the end of the arm 158 of the first latch lever 151, and is thus held in the mast stop position shown in solid line in Fig. 22, against the action of a suitably anchored coil tension spring 178 which urges plate 170 for counterclockwise movement as viewed in Fig. 22. The control and latch plate 170 also is provided with an integral longitudinally extending reset arm 180. This arm, upon release of the plate 170 from restraint by the lug 177, moves from the solid line position of Fig. 22 to the dot-dash position, in which it extends across the space between the guide channels 36 and 43 for the mast 17. Thus, upon signal and release of the mast for movement in the direction of the arrow, it engages the reset arm 180 to move plate 170 clockwise to the stop position shown in solid line.

The cam track 166 is mounted in vertically spaced relation above the stop and latch plate member 170 to move in unison therewith. To this end, and as illustrated best in Fig. 23, the journal member 171 for plate 170 has a short length of bracket channel 182 welded thereto adjacent its top (to which channel the spring 178 is connected), and the cam track 166 is in turn welded to the channel, normally extending parallel to and at one side of the center line of the transfer conveyor chain 64, as shown in Fig. 22. Cam member 166 may be fabricated of angle iron cross section, and has a latch roller limit element 184 secured to its vertical flange. The latch roller 164 of latch lever 159 rests against this member when the cam track 166 is in its normal position described, being held in that position by latching engagement of the arm 158 of lever 151 with control plate 170. It is seen from the above that when a truck mast 17 is advanced manually into the waiting station 44 it will first engage the arm 157 of first latch lever 151, camming the latter clockwise about its axis 155 to the position shown in dot-dash line in Fig. 22. This shifts the latch lug 177 of the lever arm 158 out of restraining or latching engagement with a face 176 of plate member 170. The plate 170 and attached cam track 166 thereupon move a short distance to engage the upright flange of the latter with the latch roller 164 of the second latch lever 159, then come to rest with the cam still restrained by the latch roller, in a position in which the cam track 166 will still occasion periodic movement of the propelling dog 94 of each transfer conveyor load bar 14, first out of and then back into position for engagement with a truck mast.

Structural features of the cam track 166 are shown in Fig. 25, considered with Fig. 22. It has an outwardly and upwardly inclined rise portion 186 adjacent its outer end which is successively engaged by the actuating rollers 100 of the load bars 14, and its outer end is equipped with a horizontally journalled, anti-friction roller 187. As shown in Fig. 25 (see also Fig. 27), the roller 187 rides in a fixed arcuate channel guide 188 on the auxiliary frame structure 162, thus assisting in sustaining the weight of the cam track 166 and also vertically restraining the latter when its cam rise 186 is engaged by a roller 100.

It is seen that not only does the re-entry control mechanism 150 govern the pickup of a waiting mast 17, upon signal actuation from the empty place spotter, to be described, the first latch lever 151 thereof also prevents movement of the stop and latch plate 170 to the dot-dash position of Fig. 22 in the absence of a mast at the waiting station. This is important, inasmuch as the stop and latch plate 170 is intended to be reset to its solid line position by the passage of a mast in engagement with its reset arm 180.

*Empty place spotter unit*

Structural features of this unit, generally designated 190, are best shown in Figs. 30 through 35 of the drawings. It is supported at an elevation corresponding to that of the re-entry control mechanism 150 by means of a further auxiliary framework or superstructure 191, including the vertically spaced angle iron members 192, 193 supported on longitudinal channel members 21 of the frame proper. A depending hanger unit 194 also assists in the support of the parts of unit 190.

As best shown in Figs. 30 and 32, the unit or mechanism 190 comprises a lower, mast-operated lever or arm 196 of generally U-shaped configuration. This lever is pivotally mounted for movement through positions shown in solid and dotted line in Fig. 30 by means of a first, vertically elongated shaft 197, to which the right hand extremity of lever 196 (as viewed in Fig. 30) is fixedly secured. The shaft 197 is appropriately journalled in a first elongated upright bearing tube or sleeve 198, which is secured on the auxiliary frame structure 191, as by vertically spaced pairs of U-shaped tie bolts 199 mounted to the auxiliary frame.

The upper end of shaft 197 has an operating arm or crank 200 fixedly secured thereto, for a purpose to be described.

A second, vertically elongated but shorter shaft 202 is pivotally mounted on frame structure 191 in longitudinally spaced relation to the shaft 97, in the direction of travel of the main conveyor, by means of a bearing tube or sleeve 203 similar to the tube 198, and similarly mounted on frame 191 by tie bolts 204. Shaft 202 has affixed to its lower end an arm 205 carrying an antifriction roller 206 at its end.

It is seen by reference to Fig. 32 that, whereas the mast operated lever 196 is positioned vertically for engagement by mast 17 beneath the path of travel of the main conveyor load bar 15, the roller arm 205 is positioned above the mast, for engagement and operation of its roller 206 by the load bar.

The upper end of shaft 202, above the bearing sleeve 203 and auxiliary framework 191, has fixed thereto a laterally extending operated arm 207, and a connecting link or rod 208 is pivotally connected at its respective ends to the end of the operated arm 207 and to the end of the arm or crank 200 on the first vertical shaft 197, as best shown in Fig. 30. Above the arm 207, she shaft 202 has a still further crank arm 210 fixed thereon. Arm 210 is equipped at its outer end with a pin 211 received in an elongated slot 212 at an adjacent end of a rod or link 213, which rod extends to a pivotal connection on one arm of a bell crank 214. The rod or link 167 which is operatively connected to the second latch lever 159 of the re-entry control mechanism 150 (shown in Fig. 22) is pivoted to the other arm of the bell crank 214.

The auxiliary superstructure 191 carries an inwardly facing channel 212, between the horizontal flanges of which are journalled a longitudinal spaced series of back-up rollers 213 for the main conveyor chain 55, as shown in Figs. 30 and 31.

Reference should be had to Figs. 30, 33, 34 and 35 for the conjoint operation of the empty place spotter unit 190 and the re-entry control mechanism 150. The letters "a," "b" and "c" have been employed to designate three operating positions of the parts of the unit 190, these characters each being applied to all of the component parts in their three respective positions, i.e., to the mast operated lever 196, to the upper arm 200, to the link 208, also to the lower roller arm 205 which is operated by main conveyor load bars 15, and to the upper arms 207 and 210 which move pivotally with the roller arm 205. In order to avoid confusion, two of the positions, i.e., the "a" and "c" positions, have simply been indicated by center lines of certain of the respective parts.

In the functioning of the empty place spotter 190, assuming that an advancing load bar 15 on chain 55 is occupied by a truck mast 17, and that the normal position of the parts is indicated by the reference character "a," the mast 17 will engage the U-shaped lever 196 and swing it from the "a" position to the solid line "b" position of Fig. 30, also shown in Fig. 33. This rocks upper arm 200 clockwise to its "b" position and, through the connecting link 208, rotates the connected upper arm 207 and roller arm 205 to their solid line "b" positions. The roller 206 on arm 205 is thus shifted out of position for engagement by the load bar 15, and is not actuated thereby. As this motion takes place, the top crank arm pin 211 moves idly in the slot 212 of connecting rod or link 213 so that no motion is imparted to the latter. Thus, no actuating force is transmitted by it to the re-entry control mechanism 150; and the cam track 166 of this mechanism maintains its solid line position of Fig. 22. The transfer conveyor propelling dog makes its upward movement out of position for propelling engagement with a waiting mast 17 and the latter is not picked up, information having been transmitted to the effect that the advancing main track load bar is occupied.

Again assuming the parts in their normal "a" positions, but that the advancing load bar 15 is not occupied by a truck mast, the load bar advances to a position in which it engages the roller 216 of arm 205. This swings the arm 205 and the connected upper arms 207 and 210 clockwise to the "c" position. Crank arm 210, its pin 211 then being in position at the right hand end (Fig. 30) of link slot 212, shifts the link 213 to the right, operating the re-entry control mechanism 150. Assuming that a truck mast is at the waiting station 44, having operated the first latch lever 151 to unlatch the control plate 170, the bell crank tensioning of the link 167 swings the second latch lever 159 from its solid line position of Fig. 22 to its dotted line position. Spring 178 then swings the plate 170 and rigidly connected cam track 166 from their solid line to their dotted line positions of Fig. 22. The roller 100 of the operating arm 99 of the transfer conveyor load dog 94 is thus not subjected to actuation by the cam track, and remains in the propelling position shown in Fig. 14. Since it has been signaled as being safe to return the waiting mast to the main line, the dog engages the mast and does so.

It may be noted that the last named motion of the parts of the empty place spotter 190 swings the mast operated lever 196 to its "c" position, but it will be returned to the normal "a" position when the mechanism 150 is restored, as by a spring 216 biasing the arm 168 (Fig. 33).

*Operation*

In operation, assuming that the main conveyor load bar passing the empty place spotter unit 190 of Figs. 30-35 is propelling a truck mast 17, the re-entry control mechanism of Fig. 22 remains latched in the solid line position of that figure, and nothing happens at the mechanism 22, other than the usual forward and upward lifting of the propelling dog 94 of the transfer conveyor load bar 14 to pass over the top of the mast of the waiting truck. This is the case whether or not the exit switch 53 is positioned to divert the advancing truck into the transfer conveyor line. As just described, the action involves the swinging of the roller arm 205 of unit 190 to solid line "b" position of Fig. 30 by engagement of the truck mast 17 with the U-shaped lever 196, as also shown in solid line in that figure.

If the advancing load bar 15 is not occupied by a mast, it proceeds to engage the roller arm 205 in normal "*a*" position, swinging it to the operated "*c*" position. This operates link 213 and, through the bell crank 214, operates the re-entry control mechanism, assuming that the same has been preliminarily and partially unlatched by the advance of a truck into the waiting station 44, with consequent tripping of the first latch lever 151 of Fig. 22.

Upon full unlatching of the mechanism 150 by the swing of the second latch lever 159 to the dotted line position, the stop and latch plate 170, together with the cam track 166 snap to the dotted line position. The cam follower roller 100 of the transfer conveyor load bar 14 remains undepressed, and the dog 94 picks up the waiting mast. The latter is thus advanced into the switch zone "Z" in exact coincidence with the arrival of the empty main conveyor load bar 15.

Assuming that the signal flag 147 of this truck has been properly set and has caused the release of the switch 53, through operation of arms 134 and 130, link or connecting rod 131 and latch arm 115 (see Fig. 20), the load bar 15 in question propels the mast past the switch 53 (in the dot-dash position of the same shown in Fig. 17). The mast is thus cammed by the switch to slide across the face of the propelling dog 71 of the load bar 15 and onto the face of the propelling dog 94 of the load bar 14. This is possible because the side restraining ears 77 of the load bar 15 have been swung upwardly and rearwardly to the dotted line position of Fig. 15 by the normal camming engagement of the follower roller 87 on arm 86 with the cam track 49 paralleling the main mast guide length 47.

There must be a truck at the waiting station 44 before the release mechanism 150 can be tripped and a transfer cycle can be initiated. Latch lever 151 must have been tripped by a truck mast 17 before the plate 170 can be operated through linkage 167, 213, 214 from the empty place spotter. Otherwise a truck 16 could advance and jam with another at zone Z.

The system is mechanically foolproof, and insures a high speed transfer operation without shock or inertial difficulty. All parts are accurately coordinated as to time, and their operation does not require special coordinating provision to insure desired operation.

What we claim as our invention is:

1. A conveyor transfer mechanism comprising a pair of conveyors having object propelling members traveling continuously and in parallel, horizontally side by side relation at a switch zone, means positively driving said conveyors at equal speed and with propelling members of said respective conveyors in alignment transversely of their direction of travel at said switch zone, and a switch mounted at said switch zone for movement into and out of position for engagement with an object propelled by a member of one conveyor to shift the same laterally onto the transversely aligned propelling member of the other conveyor.

2. A conveyor transfer mechanism comprising a pair of endless conveyors each having a series of object propelling members traveling continuously and in parallel, horizontally side by side relation at a switch zone, means positively driving one of said conveyors from the other at equal speed and with propelling members of said respective conveyors in alignment transversely of their direction of travel at said switch zone, and a switch mounted at said switch zone for movement into and out of position for engagement with an object propelled by a member of one conveyor to shift the same laterally onto the transversely aligned propelling member of the other conveyor.

3. A conveyor transfer mechanism comprising a pair of conveyors having object propelling members traveling continuously and in parallel side by side relation at a switch zone, means positively driving one of said conveyors from the other at equal speed and with propelling members of said respective conveyors in alignment transversely of their direction of travel at said switch zone, a movable switch at said switch zone engageable with an object propelled by a member of one conveyor to shift the same laterally onto the transversely aligned propelling member of the other conveyor, and means selectively operated by an object advancing into said switch zone to move said switch to object engaging and shifting position.

4. A conveyor transfer mechanism comprising a pair of conveyors having object propelling members traveling continuously and in parallel side by side relation at a switch zone, means positively driving one of said conveyors from the other at equal speed and with propelling members of said respective conveyors in alignment transversely of their direction of travel at said switch zone, a switch at said switch zone engageable with an object propelled by a member of one conveyor to shift the same laterally onto the transversely aligned propelling member of the other conveyor, the propelling members of said one conveyor having restraining elements mounted thereon for movement to and from position to restrain said object from said lateral shift, and means periodically operating the restraining elements out of object restraining position as the associated propelling members of said one conveyor traverse said switch zone.

5. A conveyor transfer mechanism comprising a pair of conveyors having object propelling members traveling continuously and in parallel side by side relation at a switch zone, means positively driving said conveyors at equal speed and with propelling members of said respective conveyors in alignment transversely of their direction of travel at said switch zone, a movable switch at said switch zone engageable with an object propelled by a member of one conveyor to shift the same laterally onto the transversely aligned propelling member of the other conveyor, the propelling members of said one conveyor having restraining elements mounted thereon for movement to and from position to restrain said object from said lateral shift, means selectively operated by an object advancing into said transfer zone to move said switch to object engaging and shifting position, and means periodically operating the restraining elements out of object restraining position as the associated propelling members of said one conveyor traverse said switch zone.

6. A conveyor transfer mechanism comprising a pair of endless conveyors each having a series of object propelling members traveling continuously and in parallel side by side relation at a switch zone, means positively driving one of said conveyors from the other at equal speed and with propelling members of said respective conveyors in alignment transversely of their direction of travel at said switch zone, a movable switch at said switch zone engageable with an object propelled by a member of one conveyor to shift the same laterally onto the transversely aligned propelling member of the other conveyor, the propelling members of said one conveyor having restraining elements mounted thereon for movement to and from position to restrain said object from said lateral shift, means selectively operated by an object advancing into said transfer zone to move said switch to object engaging and shifting position, and means periodically operating the restraining elements out of object restraining position as the associated propelling members of said one conveyor traverse said switch zone.

7. A pusher type conveyor system for trucks and like load bearing units each having an upright mast or like vertically extending propelling device, comprising first and second endless, horizontally traveling conveyors, each equipped with a longitudinally spaced series of load members having dogs engageable with said propelling devices to propel the respective load bearing units, means driving said conveyors continuously and at equal speed adjacent a switch zone, the load members of the respective conveyors having their respective dogs in transverse alignment with one another at said switch zone, means engageable at said switch zone with a device propelled by a dog of a first conveyor load member to transfer the load bearing unit of said device to the transversely aligned dog of the second conveyor, the dogs of the respective second conveyor load members being mounted for movement thereon out of position to engage said propelling devices and return the respective load units to said first conveyor, and means operating at a point in advance of said switch zone, in reference to the travel of said units to said zone, to move said last named dogs into and out of said engaging position.

8. A pusher type conveyor system for trucks and like load bearing units each having an upright mast or like vertically extending propelling device, comprising first and second endless, horizontally traveling conveyors, each equipped with a longitudinally spaced series of load members having dogs engageable with said propelling devices to propel the respective load bearing units, means driving said conveyors continuously and at equal speed adjacent a switch zone, the load members of the respective conveyors having their respective dogs in transverse alignment with one another at said switch zone, means engageable at said switch zone with a device propelled by a dog of a first conveyor load member to transfer the load bearing unit of said device to the transversely aligned dog of the second conveyor, the dogs of the respective second conveyor load members being mounted for movement thereon out of position to engage said propelling devices and return the respective load units to said first conveyor, means operating said last named dogs into and out of position for said engagement, and fixed means guiding said propelling devices for such return as thus engaged by said last named dogs.

9. A pusher type conveyor system for trucks and like load bearing units each having an upright mast or like vertically extending propelling device, comprising first and second endless, horizontally traveling conveyors, each equipped with a longitudinally spaced series of load members having dogs engageable with said propelling devices to propel the respective load bearing units, means driving said conveyors continuously and at equal speed adjacent a switch zone, the load members of the respective conveyors having their respective dogs in transverse alignment with one another at said switch zone, means engageable at said switch zone with a device propelled by a dog of a first conveyor load member to transfer the load bearing unit of said device to the transversely aligned dog of the second conveyor, the dogs of the respective second conveyor load members being mounted for movement thereon out of position to engage said propelling devices and return the respective load units to said first conveyor, and means operated conjointly by said propelling devices and a part of said first conveyor load members to place said second conveyor propelling dogs in or out of said engaging and return position.

10. A pusher type conveyor system for trucks and like load bearing units each having an upright mast or like vertically extending propelling device, comprising first and second endless, horizontally traveling conveyors, each equipped with a longitudinally spaced series of load members having dogs engageable with said propelling devices to propel the respective load bearing units, means driving said conveyors continuously and at equal speed adjacent a switch zone, the load members of the respective conveyors having their respective dogs in transverse alignment with one another at said switch zone, means engageable at said switch zone with a device propelled by a dog of a first conveyor load member to transfer the load bearing unit of said device to the transversely aligned dog of the second conveyor, the dogs of the respective second conveyor load members being mounted for movement thereon out of position to engage said propelling devices and return the respective load units to said first conveyor, fixed means guiding said propelling devices for such return as thus engaged, and means operated conjointly by said propelling devices and a part of said first conveyor load members to place said second conveyor propelling dogs in or out of said return position.

11. A pusher type conveyor system for trucks and like load bearing units each having an upright mast or like vertically extending propelling device, comprising first and second endless, horizontally traveling conveyors, each equipped with a longitudinally spaced series of load members having dogs engageable with said propelling devices to propel the respective load bearing units, means driving said conveyors continuously and at equal speed adjacent a switch zone, the load members of the respective conveyors having their respective dogs in transverse alignment with one another at said switch zone, means engageable at said switch zone with a device propelled by a dog of a first conveyor load member to transfer the load bearing unit of said device to the transversely aligned dog of the second conveyor, including a switch at said zone, and side restraining elements on said first conveyor load members movable into and out of position to prevent said transfer of said device by said switch, the dogs of the respective second conveyor load members being mounted for movement thereon out of position to engage said propelling devices and return the respective load units to said first conveyor, fixed means guiding said propelling devices for such return as thus engaged, and means operated conjointly by said propelling devices and a part of said first conveyor load members to place said second conveyor propelling dogs in or out of said return position.

12. A pusher type conveyor system for trucks and like load bearing units each having an upright mast or like vertically extending propelling device, comprising first and second endless, horizontally traveling conveyors, each equipped with a longitudinally spaced series of load members having dogs engageable with said propelling devices to propel the respective load bearing units, means driving said conveyors continuously and at equal speed adjacent a switch zone, the load members of the respective conveyors having their respective dogs in transverse alignment with one another at said switch zone, means engageable at said switch zone with a device propelled by a dog of a first conveyor load member to transfer the load bearing unit of said device to the transversely aligned dog of the second conveyor, including a movable switch at said zone, and side restraining elements on said first conveyor load members movable into and out of position to prevent said transfer of said device by said switch, the dogs of the respective second conveyor load members being mounted for movement thereon out of position to engage said propelling devices and return the respective load units to said first conveyor, fixed means guiding said propelling devices for such return as thus engaged, means operated conjointly by said propelling devices and a part of said first conveyor load members to place said second conveyor propelling dogs in or out of said return position, and means operated by propelling devices approaching said switch zone to selectively operate said switch to and from transferring position.

13. A conveyor system for the routing of floor trucks and like load units having an upright mast or equivalent propelling element, comprising first and second endless conveyors having means drivingly engaging the same with one another for continuous, unidirectional and equal speed travel adjacent one another and along a switch zone, load members carried by and spaced along the respective conveyors and continuously traversing said switch zone in predetermined, unvarying longitudinal transversely aligned relation to one another, and to transfer a propelling element from propelling ment by the load member of the first convey pelling engagement by the aligned load member of the second conveyor without changing the speed of travel along the switch zone, a re-entry control mechanism to govern return of a transferred load unit to said switch zone, and an empty place spotting unit in advance of said switch zone and having means operatively connecting the same to said re-entry control mechanism to govern said return.

14. A conveyor system for the routing of floor trucks and like load units having an upright mast or equivalent propelling element, comprising first and second endless conveyors having means drivingly engaging the same with one another for continuous, unidirectional and equal speed travel adjacent one another and along a switch zone, load members carried by and spaced along the respective conveyors and continuously traversing said switch zone in predetermined unvarying longitudinal and transversely aligned relation to one another, and means to transfer a propelling element from propelling engagement by the load member of the first conveyor into propelling engagement by the aligned load member of the second conveyor without changing the speed of travel along the switch zone, a re-entry control mechanism to govern return of a transferred load unit to said switch zone, and an empty place spotting unit in advance of said switch zone and having means operatively connecting the same to said re-entry control mechanism to govern said return, said re-entry control mechanism including a latch member movable by said last named connecting means from position to engage a propelling element of a load unit and prevent said return.

15. A conveyor system for the routing of floor trucks and like load units having an upright mast or equivalent propelling element, comprising first and second endless conveyors having means drivingly engaging the same with one another for continuous, unidirectional and equal speed travel adjacent one another and along a switch zone, load members carried by and spaced along the respective conveyors and continuously traversing said switch zone in predetermined, unvarying longitudinal and transversely aligned relation to one another, and means to transfer a propelling element from propelling engagement by the load member of the first conveyor into propelling engagement by the aligned load member of the second conveyor without changing the speed of travel along the switch zone, a re-entry control mechanism to govern return of a transferred load unit to said switch zone, and an empty place spotting unit in advance of said switch zone and having means operatively connecting the same to said re-entry control mechanism to govern said return, said re-entry control mechanism including a latch member movable by said last named connecting means from position to engage a propelling element of a load unit and prevent said return, and means operable by units propelled by said first conveyor and by load members of the latter to govern the position of said latch member.

16. A conveyor system for the routing of floor trucks and like load units having an upright mast or equivalent propelling element, comprising first and second endless conveyors having means drivingly engaging the same with one another for continuous and equal speed travel adjacent one another and along a switch zone, load members carried by and spaced along the respective conveyors and continuously traversing said switch zone in predetermined, unvarying longitudinal and transversely aligned relation to one another, and means to transfer a propelling element from propelling engagement by the load member of the first conveyor into propelling engagement by the aligned load member of the second conveyor without changing the speed of travel along the switch zone, a re-entry control mechanism to govern return of a transferred load unit to said switch zone, and an empty place spotting unit in advance of said switch zone and having means operatively connecting the same to said re-entry control mechanism to govern said return, said re-entry control mechanism including a latch member movable by said last named connecting means from position to engage a propelling element of a load unit and prevent said return, and a further latch element operable by said propelling element out of a position in which it holds said member in return-preventing position.

17. A conveyor system for the routing of floor trucks and like load units having an upright mast or equivalent propelling element, comprising first and second endless conveyors having means drivingly engaging the same with one another for continuous and equal speed travel adjacent one another and along a switch zone, load members carried by and spaced along the respective conveyors and continuously traversing said switch zone in predetermined, unvarying longitudinal and transversely aligned relation to one another, and means to transfer a propelling element from propelling engagement by the load member of the first conveyor into propelling engagement by the aligned load member of the second conveyor without changing the speed of travel along the switch zone, a re-entry control mechanism to govern return of a transferred load unit to said switch zone, and an empty place spotting unit in advance of said switch zone and having means operatively connecting the same to said re-entry control mechanism to govern said return, said re-entry control mechanism including a latch member movable by said last named connecting means from position to engage a propelling element of a load unit and prevent said return, and a further latch element operable by said propelling element out of a position in which it holds said member in return-preventing position, and means operable by units propelled by said first conveyor and by load members of the latter to govern the position of said latch member.

18. A conveyor system for the routing of floor trucks and like load units having an upright mast or equivalent propelling element, comprising first and second endless conveyors having means drivingly engaging the same with one another for continuous and equal speed travel adjacent one another and along a switch zone, load members carried by and spaced along the respective conveyors and continuously traversing said switch zone in predetermined, unvarying longitudinal and transversely aligned relation to one another, and means to transfer a propelling element from propelling engagement by the load member of the first conveyor into propelling engagement by the aligned load member of the second conveyor without changing the speed of travel along the switch zone, comprising a movable switch engageable with said propelling element, and means providing a signal unit located in advance of the switch zone and operating to move said switch under the control of load units propelled by the first conveyor, a re-entry control mechanism to govern return of a transferred load unit to said switch zone, and an empty place spotting unit in advance of said switch zone and having means operatively connecting the same to said re-entry control mechanism to govern said return, said re-entry control mechanism including a latch member movable by said last named connecting means from position to engage a propelling element of a load unit and prevent said return, and a further element operable by said propelling element out of a position in which it holds said member in return-preventing position, and means operable by units propelled by said first conveyor and by load members of the latter to govern the position of said latch member.

19. A mechanism for controlling the transfer of a load propelling device from one to the other of two conveyors which operate in timed convergent relation to one another, comprising means affording a waiting station from which a device is advanced by one conveyor to the other, means affording a signal station in advance of said waiting station, in respect to the travel of one conveyor toward the other, said signal station including first means operable by said load propelling device and second means operable by a load propelled by the latter, said waiting station including a control member engaged by a load propelling device to prevent said transfer, and means operatively connecting said control member to said first means of said signal station for actuation to release said device for transfer, said second means of said signal station being engageable and actuable by a device at the latter to disable said connecting means.

20. A mechanism for controlling the transfer of a load propelling device from one to the other of two conveyors which operate in timed convergent relation to one another, comprising means affording a waiting station from which a device is advanced by one conveyor to the other, means affording a signal station in advance of said waiting station, in respect to the travel of one conveyor toward the other, said signal station including first means operable by said load propelling device and second means operable by a load propelled by the latter, said waiting station including a control member engaged by a load propelling device to prevent said transfer, means operatively connecting said control member to said first means of said signal station for actuation to release said device for transfer, said second means of said signal station being engageable and actuable by a device at the latter to disable said connecting means, and means connected to said control member and operable by a load propelling device at said waiting station to render said connecting means operative.

21. A conveyor transfer mechanism comprising a pair of conveyors having object propelling members traveling continuously and in parallel, horizontally side by side relation at a switch zone, means positively driving said conveyors at equal speed and with propelling members of said respective conveyors in alignment transversely of their direction of travel at said switch zone, and means controlling the shifting of an object propelled by a member of one conveyor in a direction perpendicular to said path of travel and onto the transversely aligned propelling member of the other conveyor.

References Cited in the file of this patent

UNITED STATES PATENTS

| | | |
|---|---|---|
| 2,161,388 | Rosenthal | June 6, 1935 |
| 2,277,309 | Doll | Mar. 24, 1942 |
| 2,344,155 | McBride | Mar. 14, 1944 |
| 2,527,244 | Culver | Oct. 24, 1950 |
| 2,688,936 | Brooks | Sept. 14, 1954 |
| 2,845,034 | Harrison | July 29, 1958 |